US012619259B2

(12) United States Patent
    Sakamoto et al.

(10) Patent No.:     US 12,619,259 B2
(45) Date of Patent:         May 5, 2026

(54) CONTROL SYSTEM, CONTROL METHOD, AND NON-TRANSITORY STORAGE MEDIUM

(71) Applicant: TOYOTA JIDOSHA KABUSHIKI KAISHA, Toyota (JP)

(72) Inventors: Takumi Sakamoto, Toyota (JP); Shiro Oda, Anjo (JP); Takeshi Matsui, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 29 days.

(21) Appl. No.: 18/633,185

(22) Filed: Apr. 11, 2024

(65) Prior Publication Data

US 2024/0353862 A1     Oct. 24, 2024

(30) Foreign Application Priority Data

Apr. 19, 2023     (JP) ................................. 2023-068275

(51) Int. Cl.
| | |
|---|---|
| *G05D 1/223* | (2024.01) |
| *G05D 1/227* | (2024.01) |
| *G05D 1/656* | (2024.01) |
| *G05D 107/60* | (2024.01) |
| *G05D 109/10* | (2024.01) |

(52) U.S. Cl.
CPC ............. *G05D 1/656* (2024.01); *G05D 1/223* (2024.01); *G05D 1/227* (2024.01); *G05D 2107/65* (2024.01); *G05D 2109/10* (2024.01)

(58) Field of Classification Search
None
See application file for complete search history.

(56) References Cited

U.S. PATENT DOCUMENTS

| | | | |
|---|---|---|---|
| 2016/0346705 A1* | 12/2016 | Togawa ................... | A63H 3/36 |
| 2019/0171222 A1* | 6/2019 | Nan .......................... | A47L 9/00 |
| 2021/0339393 A1* | 11/2021 | Dan .......................... | B25J 5/007 |
| 2021/0370772 A1 | 12/2021 | Kudo | |
| 2022/0041098 A1* | 2/2022 | White ................... | A47L 9/2884 |

(Continued)

FOREIGN PATENT DOCUMENTS

| | | | | |
|---|---|---|---|---|
| JP | 2019526857 A | * | 9/2019 | ............. A47L 9/009 |
| JP | 2022-000378 A | | 1/2022 | |

(Continued)

*Primary Examiner* — Rachid Bendidi
*Assistant Examiner* — Nada Mahyoob Alqaderi
(74) *Attorney, Agent, or Firm* — OLIFF PLC.

(57)            ABSTRACT

A control system according to the present disclosure performs system control for controlling a system including a mobile robot that is autonomously movable and operable by a user. The mobile robot includes at least one light-emitting unit. The system control includes mode switch control of switching between an autonomous movement mode and a user operation mode, and the light emission control of controlling the light-emitting unit to emit light in different light emission patterns associated with a plurality of predetermined conditions. The light emission control includes controlling the light-emitting unit to emit light in different light emission patterns, for at least one of the predetermined conditions, depending on whether the mobile robot is in the autonomous movement mode or the user operation mode.

19 Claims, 10 Drawing Sheets

(56) References Cited

U.S. PATENT DOCUMENTS

2022/0339779 A1* 10/2022 Oda ..................... B25J 9/0084
2023/0182304 A1* 6/2023 Meduna .................. B25J 5/007
700/245

FOREIGN PATENT DOCUMENTS

JP            7103689 B2    7/2022
WO     WO-2018034686 A1 *  2/2018   ............. A47L 9/106

* cited by examiner

100

130

131

12

104

120

141

140

11

105

111  101  111  110  111

Z

X  Y

FIG. 2
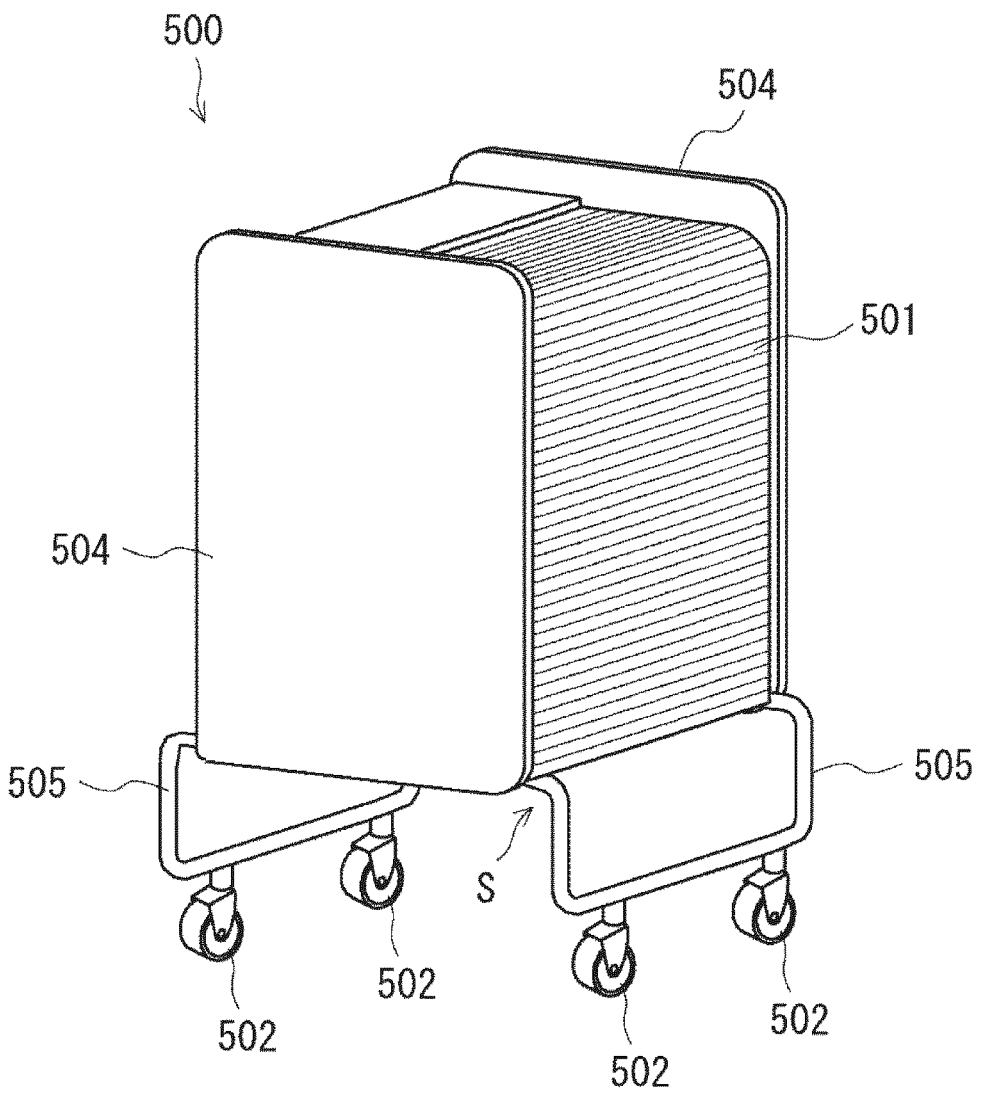
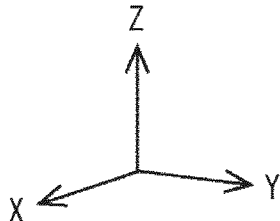

FIG. 3
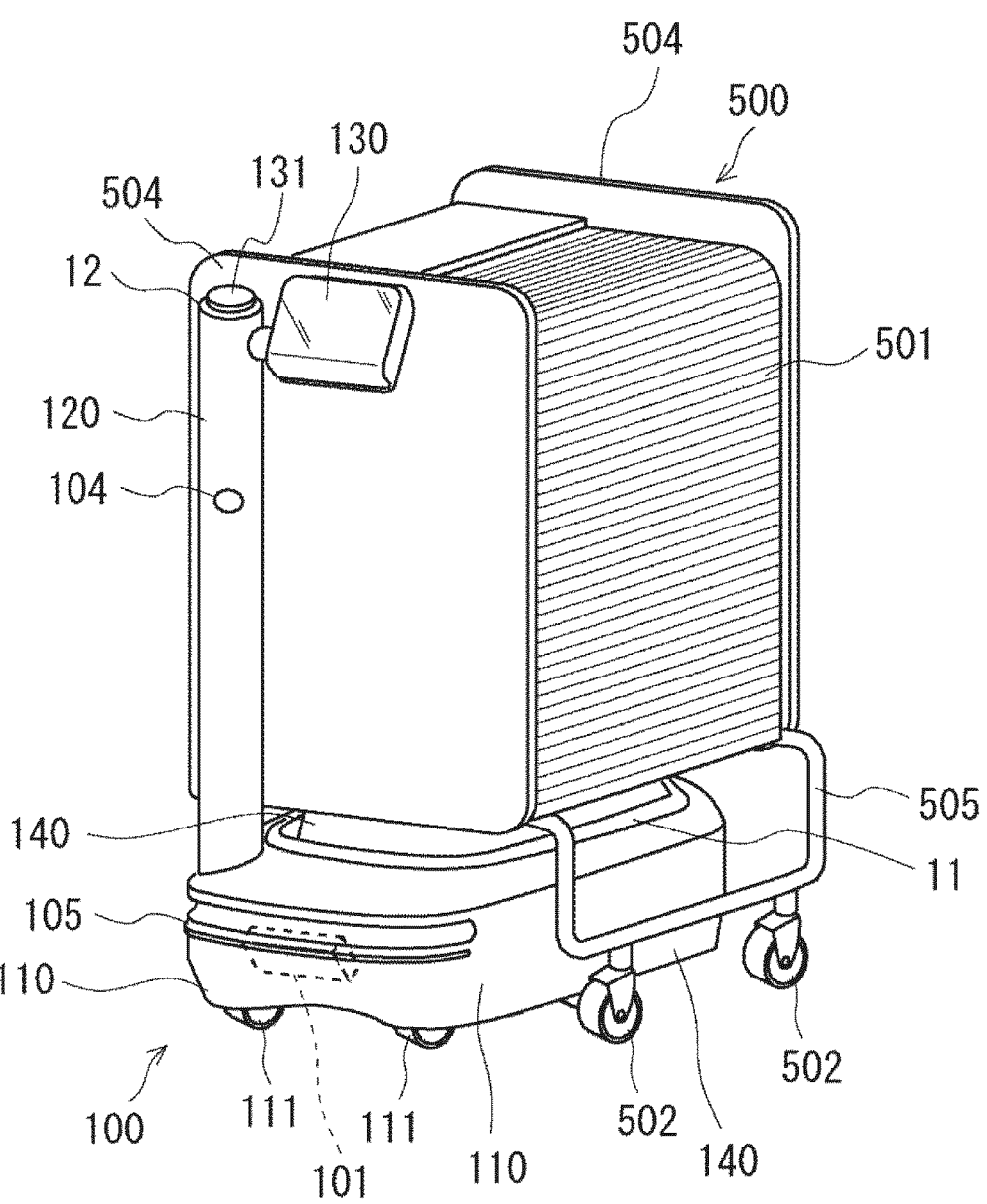
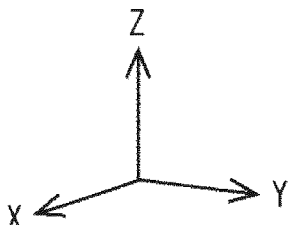

FIG. 5

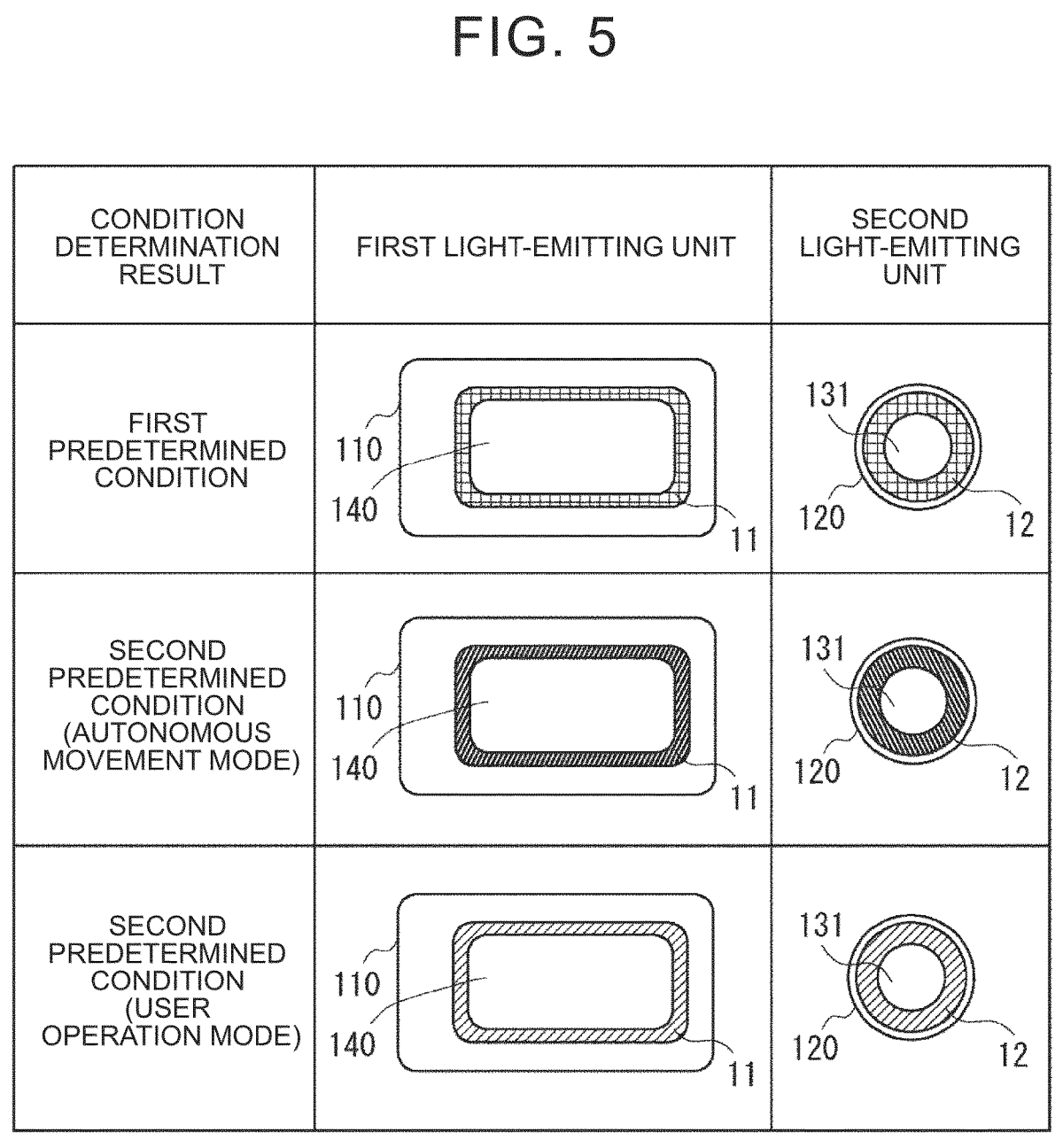

| CONDITION DETERMINATION RESULT | FIRST LIGHT-EMITTING UNIT | SECOND LIGHT-EMITTING UNIT |
|---|---|---|
| FIRST PREDETERMINED CONDITION | 110 140 11 | 131 120 12 |
| SECOND PREDETERMINED CONDITION (AUTONOMOUS MOVEMENT MODE) | 110 140 11 | 131 120 12 |
| SECOND PREDETERMINED CONDITION (USER OPERATION MODE) | 110 140 11 | 131 120 12 |

FIG. 7

| STATE OF MOBILE ROBOT | | FIRST LIGHT-EMITTING UNIT | | SECOND LIGHT-EMITTING UNIT | |
|---|---|---|---|---|---|
| | | COLOR | TURN-ON PATTERN | COLOR | TURN-ON PATTERN |
| AUTONO-MOUS MOVEMENT MODE (NORMAL) | TRAVEL-ING AUTONO-MOUSLY | GREEN | ALWAYS ON | GREEN | ALWAYS ON |
| | ON STANDBY | GREEN | BREATHING RHYTHM | GREEN | ALWAYS ON |
| | PROMPT AN OPER-ATION | BLUE | SEQUENTIAL LIGHTING | GREEN | ALWAYS ON |
| | ALERT | ORANGE | FLASHING (LONG INTERVALS) | GREEN | ALWAYS ON |
| USER OPERATION MODE (NORMAL) | TRAVEL-ING | BLUE | ALWAYS ON | GREEN | ALWAYS ON |
| | PROMPT AN OPER-ATION | BLUE | ALWAYS ON | ORANGE | SEQUENTIAL LIGHTING |
| ABNORMALITY | | RED | FLASHING (SHORT INTERVALS) | RED | ALWAYS ON |

CONTROL SYSTEM, CONTROL METHOD, AND NON-TRANSITORY STORAGE MEDIUM

CROSS-REFERENCE TO RELATED APPLICATION

This application claims priority to Japanese Patent Application No. 2023-068275 filed on Apr. 19, 2023, incorporated herein by reference in its entirety.

BACKGROUND

1. Technical Field

The present disclosure relates to control systems, control methods, and non-transitory storage mediums.

2. Description of Related Art

Japanese Patent No. 7103689 (JP 7103689 B) discloses a mobile robot that is autonomously movable and is operable by a user.

SUMMARY

In the mobile robot described in JP 7103689 B, however, people around the mobile robot cannot determine whether the mobile robot is in an autonomous movement mode or a user operation mode when the mobile robot 100 is on standby.

The present disclosure provides a control system, control method, and non-transitory storage medium that allow people around a mobile robot that is autonomously movable and operable by a user to visually see and easily determine whether the mobile robot is in the autonomous movement mode or the user operation mode when the mobile robot is on standby.

One aspect of the present disclosure provides a control system. The control system is configured to perform system control for controlling a system including a mobile robot that is autonomously movable and operable by a user. The mobile robot includes at least one light-emitting unit. The system control includes mode switch control of switching between an autonomous movement mode in which the mobile robot is moved autonomously and a user operation mode in which the mobile robot is moved based on a movement operation that is performed by the user, and light emission control of controlling the light-emitting unit to emit light in different light emission patterns associated with a plurality of predetermined conditions. The light emission control includes controlling the light-emitting unit to emit light in different light emission patterns, for at least one of the predetermined conditions, depending on whether the mobile robot is in the autonomous movement mode or the user operation mode. According to the control system with such a configuration, the mobile robot that is autonomously movable and operable by the user allows people around the mobile robot to visually see and easily determine whether the mobile robot is in the autonomous movement mode or in the user operation mode when the mobile robot is on standby. In autonomous movement control, the mobile robot can be controlled to move autonomously using a learning model obtained through machine learning.

In the control system of the above aspect, at least one of the predetermined conditions may be a recommendation condition that is predetermined condition for recommending the movement operation or a non-recommendation condition that is a predetermined condition for not recommending the movement operation. With such a configuration, the control system can make a notification recommending the movement operation to be performed by the user or a notification not recommending the movement operation to be performed by the user visible to the people around the mobile robot.

In the control system of the above aspect, the recommendation condition may include a condition for recommending an operation to switch from the autonomous movement mode to the user operation mode, and the non-recommendation condition may include a condition for not recommending the operation to switch from the autonomous movement mode to the user operation mode. With such a configuration, the control system can make a notification recommending switching to the user operation mode or a notification not recommending switching to the user operation mode visible to the people around the mobile robot.

In the control system of the above aspect, the at least one light-emitting unit may include a first light-emitting unit provided on or around an operation unit configured to receive the movement operation, at least one of the predetermined conditions may be the recommendation condition, and at least the first light-emitting unit may be controlled to emit light in the light emission pattern associated with the recommendation condition. With such a configuration, the control system can present a notification recommending an operation to be performed on the operation unit at a position easily visible from an operation position and its surroundings, and can make the notification visible to the people around the mobile robot such as an operator.

In the control system of the above aspect, the at least one light-emitting unit may include a first light-emitting unit provided on or around an operation unit configured to receive the movement operation, and a second light-emitting unit provided at a position away from the first light-emitting unit, at least one of the predetermined conditions may be the recommendation condition, and the second light-emitting unit may be controlled to emit light in the light emission pattern associated with a predetermined condition other than the recommendation condition out of the predetermined conditions. With such a configuration, the control system can make a notification other than the notification recommending an operation to be performed on the operation unit visible to the people around the mobile robot at a position different from the operation position and its surroundings, so that the people can easily determine that the notification is not a recommendation for the operation.

The control system of the above aspect may include a joystick device configured to receive the movement operation. The joystick device may include a button configured to receive a depression operation for switching between the autonomous movement mode and the user operation mode. With such a configuration, the control system can receive a mode switch operation via the joystick device with which the movement operation can be intuitively performed.

In the control system of the above aspect, the different light emission patterns may include light emission patterns that are different in at least one of brightness, hue, saturation, and lightness of light that is emitted from the light-emitting unit. With such a configuration, the control system can more clearly notify the people around the mobile robot of whether the mobile robot is in the autonomous movement mode or the user operation mode when the mobile robot is on standby.

In the control system of the above aspect, the system may include a server that is connectable to the mobile robot via wireless communication, and the control system may be configured to determine, based on an image of the mobile robot captured by a camera, whether the mobile robot is in the autonomous movement mode or the user operation mode from the light emission pattern shown by the image, at least when the server is unable to communicate with the mobile robot. In the control system with such a configuration, the server can determine whether the mobile robot is in the autonomous movement mode or the user operation mode even when the mobile robot and the server are unable to communicate with each other.

Another aspect of the present disclosure provides a control method. The control method is a method of performing system control for controlling a system including a mobile robot that is autonomously movable and operable by a user. The mobile robot includes at least one light-emitting unit. The system control includes mode switch control of switching between an autonomous movement mode in which the mobile robot is moved autonomously and a user operation mode in which the mobile robot is moved based on a movement operation that is performed by the user, and light emission control of controlling the light-emitting unit to emit light in different light emission patterns associated with a plurality of predetermined conditions. The light emission control includes controlling the light-emitting unit to emit light in different light emission patterns, for at least one of the predetermined conditions, depending on whether the mobile robot is in the autonomous movement mode or the user operation mode. According to the control method with such a configuration, the mobile robot that is autonomously movable and operable by the user allows people around the mobile robot to visually see and easily determine whether the mobile robot is in the autonomous movement mode or in the user operation mode when the mobile robot is on standby.

In the control method of the above aspect, at least one of the predetermined conditions may be a recommendation condition that is a predetermined condition for recommending the movement operation or a non-recommendation condition that is a predetermined condition for not recommending the movement operation. With such a configuration, the control method can make a notification recommending the movement operation to be performed by the user or a notification not recommending the movement operation to be performed by the user visible to the people around the mobile robot.

In the control method of the above aspect, the recommendation condition may include a condition for recommending an operation to switch from the autonomous movement mode to the user operation mode, and the non-recommendation condition may include a condition for not recommending the operation to switch from the autonomous movement mode to the user operation mode. With such a configuration, the control method can make a notification recommending switching to the user operation mode or a notification not recommending switching to the user operation mode visible to the people around the mobile robot.

In the control method of the above aspect, the at least one light-emitting unit may include a first light-emitting unit provided on or around an operation unit configured to receive the movement operation, at least one of the predetermined conditions may be the recommendation condition, and at least the first light-emitting unit may be controlled to emit light in the light emission pattern associated with the recommendation condition. With such a configuration, the control method can present a notification recommending an operation to be performed on the operation unit at a position easily visible from an operation position and its surroundings, and can make the notification visible to the people around the mobile robot such as an operator.

In the control method of the above aspect, the at least one light-emitting unit may include a first light-emitting unit provided on or around an operation unit configured to receive the movement operation, and a second light-emitting unit provided at a position away from the first light-emitting unit, at least one of the predetermined conditions may be the recommendation condition, and the second light-emitting unit may be controlled to emit light in the light emission pattern associated with a predetermined condition other than the recommendation condition out of the predetermined conditions. With such a configuration, the control method can make a notification other than the notification recommending an operation to be performed on the operation unit visible to the people around the mobile robot at a position different from the operation position and its surroundings, so that the people can easily determine that the notification is not a recommendation for the operation.

In the control method of the above aspect, the system may include a joystick device configured to receive the movement operation, and the joystick device may include a button configured to receive a depression operation for switching between the autonomous movement mode and the user operation mode. According to the control method with such a configuration, a mode switch operation can be received via the joystick device with which the movement operation can be intuitively performed.

In the control method of the above aspect, the different light emission patterns may include light emission patterns that are different in at least one of brightness, hue, saturation, and lightness of light that is emitted from the light-emitting unit. With such a configuration, the control method can more clearly notify the people around the mobile robot of whether the mobile robot is in the autonomous movement mode or the user operation mode when the mobile robot is on standby.

In the control method of the above aspect, the system may include a server that is connectable to the mobile robot via wireless communication, and the control method may further include determining, based on an image of the mobile robot captured by a camera, whether the mobile robot is in the autonomous movement mode or the user operation mode from the light emission pattern shown by the image, at least when the server is unable to communicate with the mobile robot. In the control method with such a configuration, the server can determine whether the mobile robot is in the autonomous movement mode or the user operation mode even when the mobile robot and the server are unable to communicate with each other.

Still another aspect of the present disclosure provides a non-transitory storage medium. This non-transitory storage medium is a non-transitory storage medium storing instructions that are executable by one or more processors and that cause the one or more processors to perform system control for controlling a system including a mobile robot that is autonomously movable and operable by a user. The mobile robot includes at least one light-emitting unit. The system control includes mode switch control of switching between an autonomous movement mode in which the mobile robot is moved autonomously and a user operation mode in which the mobile robot is moved based on a movement operation that is performed by the user, and light emission control of controlling the light-emitting unit to emit light in different light emission patterns associated with a plurality of predetermined conditions. The light emission control includes control for controlling the light-emitting unit to emit light in different light emission patterns, for at least one of the predetermined conditions, depending on whether the mobile robot is in the autonomous movement mode or the user operation mode. According to the non-transitory storage medium with such a configuration, the mobile robot that is autonomously movable and operable by the user allows people around the mobile robot to visually see and easily determine whether the mobile robot is in the autonomous movement mode or in the user operation mode when the mobile robot is on standby.

In the non-transitory storage medium of the above aspect, at least one of the predetermined conditions may be a recommendation condition that is predetermined condition for recommending the movement operation or a non-recommendation condition that is a predetermined condition for not recommending the movement operation. With such a configuration, the non-transitory storage medium can make a notification recommending the movement operation to be performed by the user or a notification not recommending the movement operation to be performed by the user visible to the people around the mobile robot.

In the non-transitory storage medium of the above aspect, the recommendation condition may include a condition for recommending an operation to switch from the autonomous movement mode to the user operation mode, and the non-recommendation condition may include a condition for not recommending the operation to switch from the autonomous movement mode to the user operation mode. With such a configuration, the non-transitory storage medium can make a notification recommending switching to the user operation mode or a notification not recommending switching to the user operation mode visible to the people around the mobile robot.

In the non-transitory storage medium of the above aspect, the at least one light-emitting unit may include a first light-emitting unit provided on or around an operation unit configured to receive the movement operation, at least one of the predetermined conditions may be the recommendation condition, and at least the first light-emitting unit may be controlled to emit light in the light emission pattern associated with the recommendation condition. With such a configuration, the non-transitory storage medium can present a notification recommending an operation to be performed on the operation unit at a position easily visible from an operation position and its surroundings, and can make the notification visible to the people around the mobile robot such as an operator.

In the non-transitory storage medium of the above aspect, the at least one light-emitting unit may include a first light-emitting unit provided on or around an operation unit configured to receive the movement operation, and a second light-emitting unit provided at a position away from the first light-emitting unit, at least one of the predetermined conditions may be the recommendation condition, and the second light-emitting unit may be controlled to emit light in the light emission pattern associated with a predetermined condition other than the recommendation condition out of the predetermined conditions. With such a configuration, the non-transitory storage medium can make a notification other than the notification recommending an operation to be performed on the operation unit visible to the people around the mobile robot at a position different from the operation position and its surroundings, so that the people can easily determine that the notification is not a recommendation for the operation.

In the non-transitory storage medium of the above aspect, the system may include a joystick device configured to receive the movement operation, and the joystick device may include a button configured to receive a depression operation for switching between the autonomous movement mode and the user operation mode. According to the non-transitory storage medium with such a configuration, a mode switch operation can be received via the joystick device with which the movement operation can be intuitively performed.

In the non-transitory storage medium of the above aspect, the different light emission patterns may include light emission patterns that are different in at least one of brightness, hue, saturation, and lightness of light that is emitted from the light-emitting unit. With such a configuration, the non-transitory storage medium can more clearly notify the people around the mobile robot of whether the mobile robot is in the autonomous movement mode or the user operation mode when the mobile robot is on standby.

Yet another aspect of the present disclosure provides a non-transitory storage medium. This non-transitory storage medium is a non-transitory storage medium storing instructions that are executable by one or more processors and that cause the one or more processors to perform a determination process, the computer being included in a server that is connectable via wireless communication to a mobile robot that is autonomously movable and operable by a user. The mobile robot includes at least one light-emitting unit configured to emit light in different light emission patterns associated with a plurality of predetermined conditions. The mobile robot is configured to switch between an autonomous movement mode in which the mobile robot is moved autonomously and a user operation mode in which the mobile robot is moved based on a movement operation that is performed by the user. For at least one of the predetermined conditions, the light-emitting unit is controlled to emit light in different light emission patterns depending on whether the mobile robot is in the autonomous movement mode or the user operation mode. The determination process includes a process for determining, based on an image of the mobile robot captured by a camera, whether the mobile robot is in the autonomous movement mode or the user operation mode from the light emission pattern shown by the image, at least when the server is unable to communicate with the mobile robot. In the non-transitory storage medium with such a configuration, the server can determine whether the mobile robot is in the autonomous movement mode or the user operation mode even when the mobile robot and the server are unable to communicate with each other.

According to the present disclosure, the control system, control method, and non-transitory storage medium can be provided that allow people around a mobile robot that is autonomously movable and operable by a user to visually see and easily determine whether the mobile robot is in the autonomous movement mode or the user operation mode when the mobile robot is on standby.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a perspective view showing an example of the overall configuration of a wagon to be transported by the mobile robot in FIG. 1;

FIG. 3 is a perspective view of the mobile robot in FIG. 1 transporting the wagon in FIG. 2;

FIG. 5 shows an example of light emission patterns that can be implemented by the mobile robot in FIG. 1;

FIG. 7 shows another example of the light emission patterns that can be implemented by the mobile robot of FIG. 1;

FIG. 8 is a schematic diagram illustrating an example of the overall configuration of a system including the mobile robot according to the embodiment;

DETAILED DESCRIPTION OF EMBODIMENTS

Hereinafter, the present disclosure will be described based on an embodiment of the disclosure. However, the disclosure according to the claims is not limited to the following embodiment. All the configurations described in the embodiment are not necessarily essential as means.

EMBODIMENT

Figure 1:
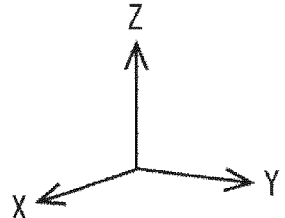
FIG. 1 is a perspective view showing an example of the overall configuration of a mobile robot according to an embodiment.

A control system according to the embodiment performs system control for controlling a system including a mobile robot that is autonomously movable and operable by a user. This mobile robot can be configured to transport an object to be transported (hereinafter also referred to as a transport object). Although such an example will be given below, the mobile robot may not be configured to transport a transport object. In the case where the mobile robot is configured to transport a transport object, the mobile robot can also be referred to as a transport robot, and the system including the mobile robot can also be referred to as a transport system. An example of the configuration of the mobile robot according to the present embodiment will be described below with reference to FIGS. 1 and 2. FIG. 1 is a perspective view showing an example of the overall configuration of the mobile robot according to the present embodiment, and FIG. 2 is a perspective view showing an example of the overall configuration of a wagon to be transported by the mobile robot in FIG. 1.

The above system such as the transport system need only include a mobile robot such as a mobile robot 100 shown in FIG. 1, but may further include other devices such as a host management device. For simplicity of description, an example will first be given in which the transport system is composed of the mobile robot 100 alone. Main features of this transport system will be described. In this example, the term "control system" can refer to either the mobile robot 100 itself or components of a control system included in the mobile robot 100.

In the following description, an XYZ orthogonal coordinate system will be used as appropriate. An X direction is a front-rear direction of the mobile robot 100 in FIG. 1, a Y direction is a right-left direction of the mobile robot 100 in FIG. 1, and a Z direction is a vertical up-down direction. More specifically, a +X direction is defined as a forward direction of the mobile robot 100, and a-X direction is defined as a rearward direction of the mobile robot 100. A+Y direction is a leftward direction of the mobile robot 100, and a-Y direction is a rightward direction of the mobile robot 100. A+Z direction is a vertically upward direction, and a-Z direction is a vertically downward direction.

The mobile robot 100 is movable in both the forward and rearward directions. That is, the mobile robot 100 moves in the forward direction when its wheels are rotated forward, and moves in the rearward direction when the wheels are rotated in reverse. Changing the rotational speed between the right and left wheels allows the mobile robot 100 to turn right or left.

As shown in FIG. 1, the mobile robot 100 can include a platform 110 on which a transport object is to be loaded, a stand 120, and an operation unit 130. The platform 110 is equipped with wheels 111, axles, a battery, a control computer 101, a drive motor, etc. It is herein assumed that the control computer 101 is mounted at the illustrated position in the platform 110. However, the control computer 101 need not necessarily be mounted at this position. The control computer 101 may be mounted at any other position in the platform 110, or part of the control computer 101 or the entire control computer 101 may be mounted in either or both of the stand 120 and the operation unit 130.

The platform 110 rotatably holds the wheels 111. In the example of FIG. 1, the platform 110 is provided with four wheels 111. The four wheels 111 are right and left front wheels, and right and left rear wheels. The mobile robot 100 moves along a desired route by independently controlling the rotational directions and rotational speeds of the wheels 111. Part of the four wheels 111 may be drive wheels, and the rest of the wheels 111 may be driven wheels. As shown in FIG. 1, an additional driven wheel(s) may be provided between, for example, the front and rear wheels 111.

In order to prevent contact with an obstacle, check the route, etc., various sensors such as a camera and a distance sensor may be mounted on at least one of the following components: the platform 110, the operation unit 130, and the stand 120.

FIG. 1 shows an example in which a camera 104 and a sensor 105 are provided as such sensors. The camera 104 is mounted facing the +X side on the stand 120, and the sensor 105 is mounted on the front side of the platform 110. A bumper may be installed on the front side of the platform 110, and the sensor 105 may be mounted on the bumper. The sensor 105 detects when an object comes into contact with the bumper. The mobile robot 100 can be controlled to stop when the sensor 105 detects contact with an object, that is, contact with an obstacle. Therefore, the sensor 105 can be referred to as a stop sensor. The sensor 105 need not necessarily be mounted on the front side. The sensor 105 may be a sensor that detects contact of an object with a bumper installed on part or all of the outer periphery of the mobile robot 100. The sensor 105 may be configured to also detect the contact position of the object on the installed bumper.

The mobile robot 100 is an autonomous mobile robot, but has a function to move according to user's operations. That is, the mobile robot 100 is a mobile robot configured to switch between an autonomous movement mode and a user operation mode. By the autonomous movement control, the mobile robot 100 can be controlled to move autonomously based on a route determined according to a set transport destination or a set route. In the autonomous movement control, the mobile robot 100 can also be controlled to move autonomously by determining a route, performing contact avoidance, etc. using a learning model obtained through machine learning.

The user operation mode in which the mobile robot 100 moves based on user operations may be any mode as long as the degree of involvement of the user operations is relatively high compared to the autonomous movement mode in which the mobile robot 100 moves autonomously. In other words, the user operation mode need not be limited to a mode in which the user controls all movements of the mobile robot with no autonomous control by the mobile robot. Similarly, the autonomous movement mode need not be limited to a mode in which the mobile robot performs fully autonomous control and does not accept any user operations. For example, the user operation mode and the autonomous movement mode may include the following first to third examples.

In the first example, the autonomous movement mode is a mode in which the mobile robot travels autonomously and determines when to stop and when to start traveling and the user does not perform any operations, and the user operation mode is a mode in which the mobile robot travels autonomously and the user operates to stop the mobile robot and to control the mobile robot to start traveling. In the second example, the autonomous movement mode is a mode in which the mobile robot travels autonomously and the user operates to stop the mobile robot and to control the mobile robot to start traveling, and the user operation mode is a mode in which the mobile robot does not travel autonomously and the user not only operates to stop the mobile robot and to control the mobile robot to start traveling but also operates to control the mobile robot to travel. In the third example, the autonomous movement mode is a mode in which the mobile robot travels autonomously and determines when to stop and when to start traveling and the user does not perform any operations, and the user operation mode is a mode in which the mobile robot travels autonomously for speed adjustment, contact avoidance, etc. and the user operates to change the direction of travel and the route etc.

The user may be a worker etc. at a facility where the mobile robot 100 is utilized, and may be a hospital worker when the facility is a hospital.

The control computer 101 can be implemented by, for example, integrated circuitry, and can be implemented by, for example, a processor such as a micro processor unit (MPU) or a central processing unit (CPU), a working memory, and a nonvolatile storage device. Control programs to be executed by the processor are stored in the storage device, and the processor can perform the function to control the mobile robot 100 by loading the control programs into the working memory and executing them. The control computer 101 can be referred to as a control unit.

The control computer 101 controls the mobile robot 100 to move autonomously toward a preset transport destination or along a preset transport route, based on prestored map data and information acquired by the various sensors exemplified by the camera 104. This autonomous movement control can include control for loading a wagon 500 shown in FIG. 2 and control for unloading the wagon 500. The wagon 500 will be described later. It can be said that the control computer 101 can include a movement control unit that performs such autonomous movement control.

In order to load and unload a transport object such as the wagon 500, the platform 110 may include a lifting mechanism 140 for loading and unloading a transport object. Part of the lifting mechanism 140 can be housed inside the platform 110. The lifting mechanism 140 can be installed with its loading surface, namely its surface on which a transport object is to be loaded, being exposed on the upper surface of the platform 110. The lifting mechanism 140 is a lifting stage configured to be raised and lowered, and can be raised and lowered as controlled by the control computer 101. The platform 110 is provided with a motor and a guide mechanism for the raising and lowering of the lifting mechanism 140. An upper surface of the lifting mechanism 140 serves as a loading surface on which the wagon 500 as a transport object is to be loaded. The wagon 500 is not limited to the configuration shown in FIG. 2, and may be any predetermined wagon of a size, shape, and weight that are loadable and transportable on the lifting mechanism 140. The lifting mechanism 140 includes a lift mechanism for lifting the wagon 500. Space above the lifting mechanism 140 serves as a loading space for loading a transport object. As far as the user loads the wagon 500, the platform 110 may not include the lifting mechanism 140.

The platform 110 may include a first light-emitting unit 11 at a position around the lifting mechanism 140. The first light-emitting unit 11 may have any configuration as long as it can emit light. The first light-emitting unit 11 may be composed of, for example, one or more light-emitting diodes (LEDs) or organic electroluminescence, and its light emission can be controlled by the control computer 101. The position, shape, and size of the first light-emitting unit 11 are not limited to those illustrated in the drawings. The mobile robot 100 may include the first light-emitting unit 11 even when the mobile robot 100 does not include the lifting mechanism 140. The terms "first" and "second" are used for the first light-emitting unit 11 and a second light-emitting unit 12 described later merely in order to distinguish therebetween.

The stand 120 is attached to the platform 110. The stand 120 is a rod-shaped member extending upward from the platform 110. In this example, the stand 120 is in a cylindrical shape that is long in the Z direction. However, the stand 120 may be in any shape, and the mobile robot 100 may not include the stand 120. The longitudinal direction of the stand 120 is parallel to the Z direction. The stand 120 is installed outside the lifting mechanism 140. That is, the stand 120 is installed so as not to interfere with the rising and lowering movements of the lifting mechanism 140. The stand 120 is installed on one end side of the platform 110 in the Y direction (right-left direction). The stand 120 is attached near the right front corner of the platform 110. The stand 120 is installed at the end of the platform 110 that is located on the +X side and −Y side on an XY plane.

The stand 120 may be provided with, for example, a stick unit 131 of a joystick device or an emergency stop button for stopping the mobile robot 100 in case of emergency, on its upper surface portion. The joystick device is a device that is operated to move the mobile robot 100 in a direction intended by the user when in the user operation mode. Since the user can grip the stick unit 131 with his or her hand, the stick unit 131 can be referred to as a grip unit. The joystick device can receive a directional operation when the user tilts the stick unit 131 in a direction in which the user wants the mobile robot 100 to move. The joystick device can also be controlled to perform a switch operation to switch between the autonomous travel mode and the user operation mode by depressing the stick unit 131. Alternatively, the joystick device may be controlled to perform a select operation by depressing the stick unit 131. The stick unit 131 may be configured to serve as an emergency stop button when it is depressed for a predetermined period. When the stick unit 131 is configured to receive two or more of the switch operation, the select operation, and the emergency stop operation, this predetermined period need only be varied between or among such operations.

The stand 120 may include a second light-emitting unit 12 at a position around the stick unit 131. The second light-emitting unit 12 may have any configuration as long as it can emit light. The second light-emitting unit 12 may be composed of, for example, one or more LEDs or organic electroluminescence, and its light emission can be controlled by the control computer 101. The position, shape, and size of the second light-emitting unit 12 are not limited to those illustrated in the drawings. The mobile robot 100 may include the second light-emitting unit 12 even when the mobile robot 100 does not include the stand 120 or even when the mobile robot 100 includes the stand 120 but does not include the stick unit 131.

The stand 120 supports the operation unit 130. The operation unit 130 is attached near the upper end of the stand 120. The operation unit 130 can thus be installed at a height that is easy for the user to operate. That is, the stand 120 extends to a height that is easy for the standing user to operate the operation unit 130, and the stick unit 131 is also installed at a height that is easy for the user to operate. The operation unit 130 extends to the +Y side from the stand 120. From the standpoint of ease of operation, the operation unit 130 may be mounted in the middle in the right-left direction of the platform 110.

The operation unit 130 may include a touch panel monitor etc. that receives user operations. The operation unit 130 may include a microphone etc. for audio input. The monitor of the operation unit 130 faces the opposite side from the platform 110. That is, a display surface (operation surface) of the operation unit 130 is a surface on the +X side of the operation unit 130. The operation unit 130 may be detachable from the stand 120. That is, a holder that holds a touch panel may be attached to the stand 120. The user can enter a transport destination of a transport object, transport information about the transport object, etc. by operating the operation unit 130. The operation unit 130 can display, to the user, information such as details of a transport object being transported or a transport object to be transported and a destination of the transport object. The mobile robot 100 may not include the operation unit 130. Even in that case, the mobile robot 100 is configured to be operable in the user operation mode. For example, the mobile robot 100 may be equipped with a device that is operated when in the user operation mode, such as the joystick device, or may be connected to an operation device for remote operations.

As illustrated in the drawings, the operation unit 130 and the stick unit 131 can be mounted at at least about the same height so that they can be operated intuitively. This allows the user to operate the operation unit 130 and the stick unit 131 in an intuitive flow even when an operation to depress the stick unit 131 is assigned to an operation to select an operation displayed on the operation unit 130.

An integrated circuit (IC) card reader for the user to get authenticated using an IC card etc. may be installed on the stand 120 at about the same height position as the operation unit 130 or inside the operation unit 130. Although the mobile robot 100 need not necessarily have a user authentication function, the mobile robot 100 with the user authentication function can block mischievous operations by a third party etc. The user authentication function is not limited to the type using an IC card, and may be of the type using user information and password that are entered via the operation unit 130. However, the user authentication function of the type using various short-range wireless communication technologies that allow contactless authentication can save the user a hassle and can prevent infection.

The user can place a transport object in the wagon 500 loaded on such a mobile robot 100 and request the mobile robot 100 to transport the transport object. The wagon 500 itself can also be referred to as a transport object. Therefore, for convenience, a transport object that is placed in the wagon 500 will be hereinafter referred to as an article in order to distinguish between them. The mobile robot 100 transports the wagon 500 by autonomously moving to a set destination. That is, the mobile robot 100 performs the task of transporting the wagon 500. In the following description, a location where the wagon 500 is loaded will be referred to as a transport origin or a loading location, and a location to which the wagon 500 is delivered will be referred to as a transport destination or a destination.

For example, it is assumed that the mobile robot 100 moves around a general hospital with a plurality of clinical departments. The mobile robot 100 transports an article such as supplies, consumables, and medical equipment between the clinical departments. For example, the mobile robot 100 delivers an article from a nurses' station of one clinical department to a nurses' station of another clinical department. Alternatively, the mobile robot 100 delivers an article from a storage for supplies and medical equipment to a nurses' station of a clinical department. The mobile robot 100 also delivers medicine dispensed in a dispensing department to a clinical department or patient expected to use the medicine.

Examples of the article include medicines, consumables such as bandages, specimens, test equipment, medical equipment, hospital foods, and supplies such as stationery. Examples of the medical equipment include sphygmomanometers, blood transfusion pumps, syringe pumps, foot pumps, nurse call buttons, bed leaving sensors, low-pressure continuous suction devices, electrocardiogram monitors, infusion controllers, enteral feeding pumps, ventilators, cuff pressure gauges, touch sensors, inhalers, nebulizers, pulse oximeters, artificial resuscitators, aseptic isolators, and ultrasound diagnostic equipment. The mobile robot 100 may transport meals such as hospital foods and foods for a special diet a patient follows to prepare for a test. The mobile robot 100 may transport used equipment, used tableware, etc. When the transport destination is on a different floor, the mobile robot 100 may move using an elevator etc.

Next, details of the wagon 500 and an example of how the mobile robot 100 holds the wagon 500 will be described with reference to FIGS. 2 and 3. FIG. 3 is a perspective view of the mobile robot 100 transporting the wagon 500.

The wagon 500 includes a storage portion configured to store an article, and a support portion supporting the storage portion with a space under the storage portion to allow insertion of at least part of the platform 110. As shown in FIG. 2, the storage portion may include side plates 504 on both sides of the wagon 500 and a cover 501 that can be opened and closed. The user can unload an article loaded in the wagon 500 from the wagon 500 by opening the cover 501. As shown in FIG. 2, the support portion may include a support frame 505 supporting the storage portion, and wheels 502 attached under the support frame 505. The wheels 502 may be provided with covers, not shown.

The wagon 500 can be held by the lifting mechanism 140 of the mobile robot 100 as described above. The lifting mechanism 140 is a mechanism for loading and unloading the wagon 500 as a transport object onto and from the upper surface side of at least part of the platform 110. Since the mobile robot 100 includes the lifting mechanism 140, the mobile robot 100 can easily automatically transport the wagon 500.

As shown in FIG. 3, the mobile robot 100 can hold the wagon 500 by the lifting mechanism 140. The space to allow insertion of at least part of the platform 110 is a space S under the wagon 500 shown in FIG. 2. This space S is a space into which the platform 110 is to be inserted. That is, the platform 110 can enter the space S directly under the wagon 500. When loading the wagon 500 onto the platform 110, the mobile robot 100 moves in the −X direction and enters directly under the wagon 500. The platform 110 enters directly under the wagon 500 from the side in the front-rear direction on which the stand 120 is not installed. The wagon 500 can thus be loaded without the stand 120 interfering with the wagon 500. In other words, the stand 120 can be attached near the corner of the platform 110 so as not to interfere with the wagon 500.

As shown in FIG. 1, a contact portion of the lifting mechanism 140 may have recesses 141. The contact portion is a portion that contacts the bottom surface of the wagon 500 by, for example, coupling or connection when the wagon 500 loaded on the lifting mechanism 140 is transported. This contact portion can be the upper surface of the lifting mechanism 140. The wagon 500 can have protrusions, not shown, on the bottom of the storage portion. The wagon 500 can be fixed to the mobile robot 100 by fitting the protrusions into the recesses 141.

Although the wagon 500 is illustrated as a cart with the wheels 502, the form and configuration of the wagon 500 are not particularly limited. The predetermined wagon exemplified by the wagon 500 may be any wagon as long as it has a shape, size, and weight that are transportable by the mobile robot 100.

The operations to load the wagon 500, transport the wagon 500 to a transport destination, and unload the wagon 500 by the mobile robot 100 will be described. First, regarding the loading of the wagon 500, the mobile robot 100 can be a mobile robot that is set in advance to transport the wagon 500, and moves in search of the wagon 500 or moves to a known position. For example, the wagon 500 whose position is specified by the user can be assigned to the mobile robot 100 as an object to be transported or an object to be searched for, and the mobile robot 100 can autonomously move in order to transport the wagon 500. Alternatively, the mobile robot 100 may automatically transport the wagon 500 to a transport destination when it finds the wagon 500 on the way back after finishing a task of transporting another wagon or an article. The present disclosure is not limited to these examples, and various methods can be applied to the utilization of the mobile robot 100 for transport of the wagon 500.

The mobile robot 100 moves to the position of the wagon 500, and the control computer 101 recognizes the wagon 500 based on information acquired by the camera 104 or other sensor, and controls the lifting mechanism 140 to load the wagon 500. This control to load the wagon 500 can also be referred to as pickup control.

In the pickup control, the platform 110 is first inserted into the space S directly under the wagon 500, and the lifting mechanism 140 is raised when the insertion is completed. The lifting stage that is the upper surface of the lifting mechanism 140 thus comes into contact with the wagon 500, so that the lifting mechanism 140 can lift the wagon 500. That is, as the lifting mechanism 140 rises, the wheels 502 are lifted off the floor surface, and the wagon 500 is loaded onto the platform 110. The mobile robot 100 is thus docked with the wagon 500 and becomes ready to head to the transport destination. The control computer 101 then controls driving of the wheels 111 etc. so that the mobile robot 100 moves autonomously along a set route. The mobile robot 100 thus transports the wagon 500 to the transport destination.

The mobile robot 100 moves to the transport destination of the wagon 500, and the control computer 101 controls the lifting mechanism 140 to unload the wagon 500. In this control, the lifting mechanism 140 is lowered to unload the wagon 500 from the platform 110. The wheels 502 come into contact with the floor surface, and the upper surface of the lifting mechanism 140 is separated from the wagon 500. The wagon 500 is thus placed on the floor surface. The wagon 500 can be unloaded from the platform 110 in this manner.

The above various examples are given on the assumption that the mobile robot 100 transports a wagon such as the wagon 500 as a transport object. However, even in the case where the mobile robot 100 is configured to transport a wagon, the mobile robot 100 may be utilized to transport an individual article (load) as a transport object. In that case, a storage box or shelf that keeps the article from falling while the mobile robot 100 is moving is preferably attached to the mobile robot 100.

There may be situations where the mobile robot 100 is utilized to transport a plurality of articles and it is necessary to transport the articles to a plurality of transport destinations. In this case, the user can unload the articles at the transport destinations regardless of whether the wagon 500 is used for transport. The mobile robot 100 can transport a wagon or an individual article(s) by autonomously moving to a set destination or by moving to a set destination according to user operations.

Figure 4:
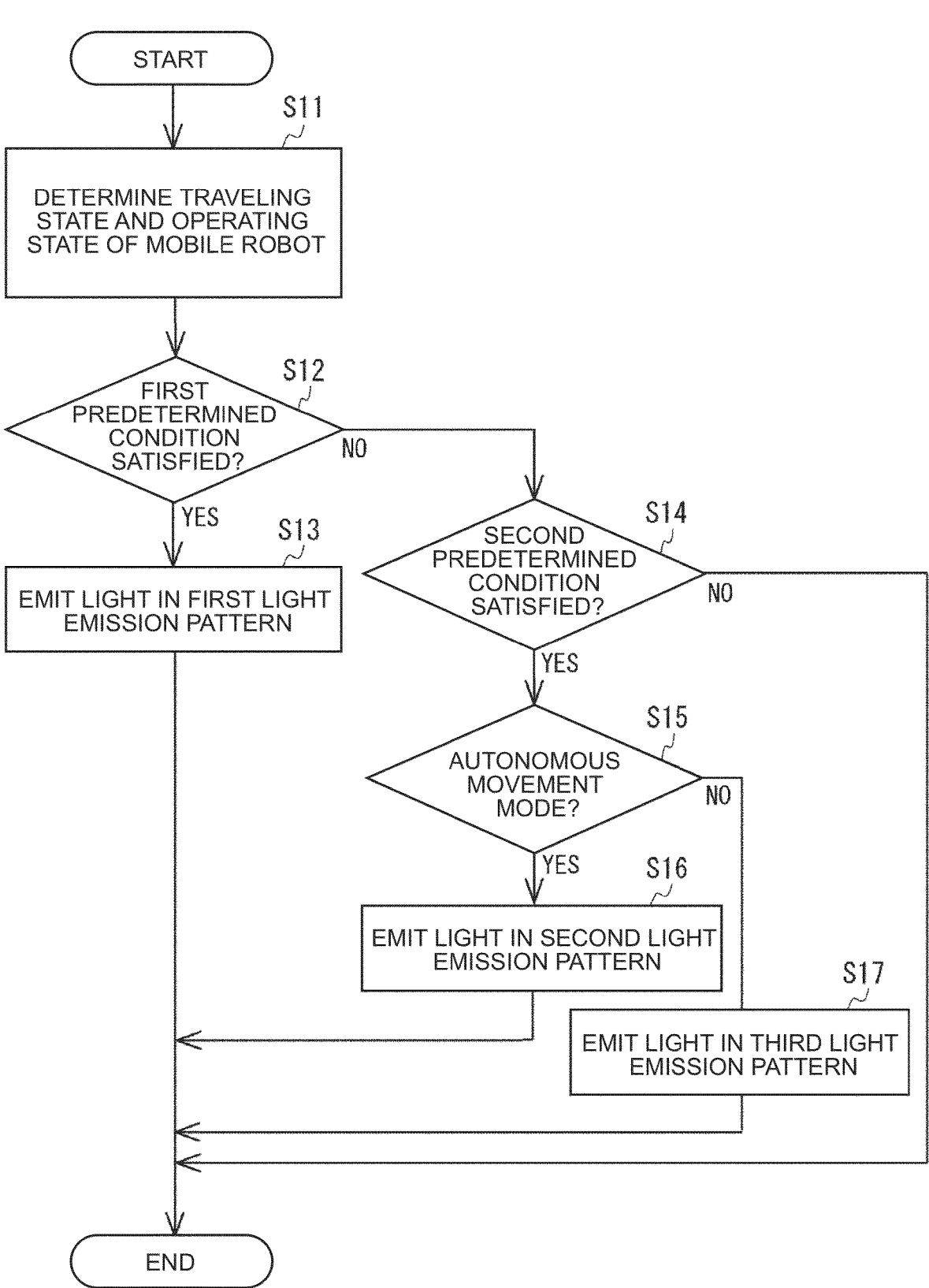
FIG. 4 is a flowchart illustrating an example of a light emission process that is performed by the mobile robot in FIG. 1.

Next, an example of a main feature of the present embodiment will be described with reference to FIGS. 4 and 5. FIG. 4 is a flowchart illustrating an example of a light emission process that is performed by the mobile robot 100. FIG. 5 shows an example of light emission patterns that can be implemented by the mobile robot 100.

The main feature of the present embodiment is that the mobile robot 100 includes: an operation unit that is operated to perform operations such as an operation to move the mobile robot 100 (hereinafter also referred to as a movement operation) on the mobile robot 100, as exemplified by the joystick device and the operation unit 130; and a light-emitting unit as exemplified by the first light-emitting unit 11 and the second light-emitting unit 12. Although an example in which the mobile robot 100 includes an operation unit will be described below, the mobile robot 100 may not include an operation unit, and a movement operation for the mobile robot 100 may be performed via an operation unit provided on a device other than the mobile robot 100.

The control computer 101 performs, as part of the system control described above, mode switch control for switching between the autonomous movement mode and the user operation mode described above. The shape and size of the joystick device are not limited to this example. In the case where the operation unit 130 receives a movement operation, a user interface configured to receive operations using software can be displayed on the screen. Although an example in which the mobile robot 100 includes the joystick device and the operation unit 130 as an operation unit will be described below, the operation unit may be any device as long as it receives an operation to move the mobile robot 100 when in the user operation mode. The operation unit may be configured to also receive an operation to switch between the autonomous movement mode and the user operation mode. This allows to perform such a switch operation on the mobile robot 100.

The control computer 101 also performs, as part of the system control described above, light emission control for controlling the light-emitting unit to emit light in different light emission patterns associated with a plurality of predetermined conditions. The light emission pattern can also be referred to as a light emission mode. An example in which the mobile robot 100 includes light-emitting units at two positions will be described below. However, the mobile robot 100 may include a light-emitting unit at one position or may include light-emitting units at three or more positions, and the position, shape, and size of each light-emitting unit are not limited to the illustrated example. From the viewpoint of visibility from the surroundings, the light-emitting units are preferably mounted at a plurality of positions away from each other, as exemplified by the first light-emitting unit 11 and the second light-emitting unit 12. The correspondence between the predetermined conditions and the light emission patterns can be stored in the form of a table etc. in a storage unit in the control computer 101 for reference as needed.

The predetermined conditions may include, but are not limited to, either or both of a condition regarding the traveling state associated with the traveling environment of the mobile robot 100 and a condition regarding the operating state of the mobile robot 100. The "traveling state" can refer to, for example, whether a traveling abnormality associated with the traveling environment such as contact with a wall has occurred in the mobile robot 100. For convenience, the "operating state" herein refers to a state other than the state of the mode indicating whether the mobile robot 100 is in the autonomous movement mode or the user operation mode. The "operating state" is herein described as indicating whether there is some kind of operational abnormality or indicating what the operational abnormality is. As used herein, the "operational abnormality" can refer to abnormalities other than abnormalities in the traveling state associated with the traveling environment of the mobile robot 100, and can refer to various abnormalities of the mobile robot 100, such as a dead battery, an abnormality in a drive unit, and an abnormality in any wheel. The mobile robot 100 may be configured to detect the occurrence of an earthquake, fire, etc. through external communication or using a sensor included in the mobile robot 100. In such a configuration, the predetermined conditions may include whether an earthquake has occurred or whether a fire has occurred.

The control computer 101 can also perform, as at least part of the light emission control described above, control for controlling the light-emitting unit to emit light in different light emission patterns according to whether the mobile robot 100 is in the autonomous movement mode or the user operation mode for at least one of the predetermined conditions.

In order to perform such control, the control computer 101 first determines the traveling state of the mobile robot 100 based on the detection results from sensors such as the sensor 105, and determines the operating state indicating the presence or absence of an operational abnormality in the mobile robot 100 (step S11). The order in which the traveling state and the operating state are determined does not matter. The determination of the operating state is made as to, for example, whether there is any operational abnormality, and where the abnormality is located, such as in the battery, the drive unit, or any wheel. For example, this determination can be made by the control computer 101 based on the detection results from various sensors mounted on the mobile robot 100.

The determination of the traveling state can be made by the control computer 101 performing information processing, image processing, etc. based on the detection results from the sensors such as the sensor 105. The following description is given on the assumption that the determination is made in this manner. The sensors may have a function to make such a detection that the result of the detection indicates the determination result itself of the traveling state, or to determine the traveling state by performing information processing, image processing, etc. based on the sensing result. In that case, the sensors send their determination results to the control computer 101, and the control computer 101 can use the information received from the sensors as the determination result of the traveling state. The determination of the traveling state may be made by a determination unit provided separately from the control computer 101 that performs the light emission control.

Like the determination of the traveling state, the determination of the operating state can also be made by the control computer 101 performing information processing, image processing, etc. based on the detection results from the various sensors. The following description is given on the assumption that the determination is made in this manner. The sensors may have a function to make such a detection that the result of the detection indicates the determination result itself of the operating state, or to determine the operating state by performing information processing, image processing, etc. based on the sensing result. In that case, the sensors send their determination results of the operating state to the control computer 101, and the control computer 101 can use the information received from the sensors as the determination result of the operating state. The determination of the operating state may be made by a determination unit provided separately from the control computer 101 that performs the light emission control.

The mobile robot 100 may include in, for example, the control computer 101 a storage unit, not shown, configured to store the information indicating the traveling state and operating state thus acquired. The control computer 101 may determine the traveling state and the operating state based on information indicating the most recently stored traveling state and operating state, respectively.

After step S11, the control computer 101 determines whether a first predetermined condition is satisfied based on the determined traveling state and operating state (step S12). For convenience, the description will be given on the assumption that the first predetermined condition is that there is no abnormality in either the traveling state or the operating state, namely both the traveling state and the operating state are normal.

When both the traveling state and the operating state are normal, the control computer 101 controls the first light-emitting unit 11 and the second light-emitting unit 12 to emit light in a first light emission pattern as exemplified in, for example, "first predetermined condition" in FIG. 5 (step S13), and the process ends.

When the traveling state and/or the operating state are not normal, that is, when there is some kind of abnormality in either or both of the traveling state and the operating state, the control computer 101 determines whether a second predetermined condition is satisfied (step S14). For convenience, it is herein assumed that the second predetermined condition is a condition that, regarding either or both of the traveling state and the operating state, the mobile robot 100 will fall into a state that needs action if the mobile robot 100 continues to travel. When the second predetermined condition is satisfied, the control computer 101 determines whether the mobile robot 100 is currently in the autonomous movement mode or the user operation mode (step S15). Information indicating whether the mobile robot 100 is in the autonomous movement mode or the user operation mode can be obtained by referring to the current movement mode of the control computer 101.

When the mobile robot 100 is in the autonomous movement mode, the control computer 101 controls the first light-emitting unit 11 and the second light-emitting unit 12 to emit light in a second light emission pattern as exemplified in, for example, "second predetermined condition (autonomous movement mode)" in FIG. 5 (step S16), and the process ends. When the mobile robot 100 is in the user operation mode, the control computer 101 controls the first light-emitting unit 11 and the second light-emitting unit 12 to emit light in a third light emission pattern as exemplified in, for example, "second predetermined condition (user operation mode)" in FIG. 5 (step S17), and the process ends. The above process can be repeated, for example, at predetermined intervals at which the traveling state and the operating state are determined, or every time there is a change in detection results from the sensors that are used to determine the traveling state or the operating state.

As shown in the examples of "first predetermined condition," "second predetermined condition (autonomous movement mode)," and "second predetermined condition (user operation mode)" in FIG. 5, light emission in a plurality of light emission patterns corresponding to the traveling states and the operating states, such as the first light emission pattern, the second emission pattern, and the third emission pattern, can be performed in the same light-emitting area. Although FIG. 5 illustrates an example in which this same light-emitting area is both the first light-emitting unit 11 and the second light-emitting unit 12, this same light-emitting area may be either the first light-emitting unit 11 or the second light-emitting unit 12. This allows the user to easily notice an abnormality and to easily notice that an abnormality has been eliminated, because the portion that usually emits light in a normal mode emits light in a different mode.

For example, the first to third light emission patterns in this example can be such that the first light emission pattern is the most inconspicuous, the second light emission pattern is the most conspicuous to the surroundings, and the third light emission pattern is the most conspicuous to the operator. The light emission patterns used in the light emission control may include a pattern in which the light-emitting unit is turned off. For example, the first light emission pattern may be a pattern in which both the first light-emitting unit 11 and the second light-emitting unit 12 are turned off. As described above, the light emission patterns to be used, such as the first to third light emission patterns and other light emission patterns that will be described later, may be stored in the form of, for example, a table in the control computer 101 so that they can be referred to during the light emission control.

Although the same light emission pattern, namely the first light emission pattern, is used for both the autonomous movement mode and the user operation mode in this example, the light emission pattern may be changed between these modes when YES in step S12. In this example, the process is performed using only two predetermined conditions, namely the first predetermined condition and the second predetermined condition. However, three or more predetermined conditions, namely more detailed conditions, may be used to present different light emission patterns according to the predetermined conditions.

It is often the case that the mobile robot 100 is in a stopped state, namely on standby, when either the traveling state or the operating state indicates an abnormality. Therefore, by performing the light emission control according to whether the mobile robot 100 is in the autonomous movement mode or the user operation mode as described above, the mobile robot 100 allows the surroundings to easily determine whether the mobile robot 100 is in a stopped state in the autonomous movement mode or in the user operation mode. That is, the mobile robot 100 allows the surroundings to visually see and easily determine whether the mobile robot 100 is in the autonomous movement mode or in the user operation mode when the mobile robot 100 is on standby. As used herein, the "surroundings" include not only surrounding people, but also surveillance cameras that will be described later as environment cameras. It can be said that the surveillance cameras can also clearly capture images of the traveling state. As can be seen from the above description, the first light-emitting unit 11 and the second light-emitting unit 12 can function as indicators indicating, for example, whether the mobile robot 100 is in the autonomous movement mode or the user operation mode.

As described above, the first light-emitting unit 11 is a light-emitting unit mounted around the contact portion that may contact a transport object when the transport object is loaded and transported. That is, the light-emitting unit is mounted on the mobile robot 100 in consideration of the portion on which a transport object is to be loaded, as exemplified by the positional relationship between the first light-emitting unit 11 and the lifting stage. This contact portion can also be referred to as a loading surface. The first light-emitting unit 11 is mounted around the contact portion on the body of the mobile robot 100. This contact portion is a portion that contacts a transport object when the loaded transport object is transported. For example, a portion that contacts a transport object only during loading before transport of the transport object can be excluded from the contact portion. The contact portion can be, for example, a contact portion that contacts the bottom surface of a transport object. Therefore, a portion that contacts a side surface of a transport object can be excluded from the contact portion. Although possible transport objects include various transport objects with various sizes and shapes, the contact portion that may contact a transport object can refer to a portion that has a possibility of being in contact with a transport object during transport of the transport object, such as the upper surface of the lifting mechanism 140. Therefore, when the loaded wagon 500 or other loaded transport object is being transported, light emitted from the first light-emitting unit 11 is visible, for example, at least from obliquely above the mobile robot 100 or from the side of the mobile robot 100. The mobile robot 100 is thus easily visible from the surroundings even when the mobile robot 100 has a transport object loaded thereon, and is even more easily visible from the surroundings when the mobile robot 100 does not have any transport object loaded thereon. It is therefore possible to clearly notify the surroundings of the mobile robot 100 of whether the mobile robot 100 is in the autonomous movement mode or the user operation mode. In the case where light is emitted from the area around the contact portion as in this example and the wagon 500 is used for transport, the wagon 500 may have a mirror lower surface to make the light emission more visible to the surroundings of the mobile robot 100.

As described above, the second light-emitting unit 12 is a light-emitting unit mounted on or around the joystick device for operating the mobile robot 100. The light-emitting unit is mounted on the mobile robot 100 at a position high enough for the light-emitting unit to be easily visible from the operator or the surroundings, that is, at the operation position, as particularly exemplified by the second light-emitting unit 12. The mobile robot 100 can thus clearly notify the surroundings of which predetermined condition is satisfied, whether the mobile robot 100 is in the autonomous movement mode or the user operation mode, etc. even in a direction from which the loading position is less visible depending on the transport object such as the wagon 500.

As described above, the mobile robot 100 may include the sensor 105 that detects contact of an object with the outer periphery of the mobile robot 100. In this case, the traveling state is determined as follows. The control computer 101 determines that there is a traveling abnormality in the traveling state when the sensor 105 detects that an object is in contact with the mobile robot 100. The control computer 101 determines that there is no traveling abnormality in the traveling state when the sensor 105 detects no contact of an object with the mobile robot 100. In the case where a condition that such contact has occurred is added as at least one of the predetermined conditions, the mobile robot 100 can indicate the occurrence of such contact by a light emission pattern different from the other light emission patterns.

With this configuration, the mobile robot 100 can clearly notify the surroundings that the mobile robot 100 is in contact with an object, and can also clearly notify the surroundings when the mobile robot 100 is no longer in contact with the object. The mobile robot 100 includes a sensor, such as the sensor 105, that detects contact of an object with the bumper installed on the outer periphery of the mobile robot 100. The bumper can protect the body of the mobile robot 100 and the object that has come into contact with the bumper. The abnormal state can be determined based on information not only from the sensor 105 but also from other sensors such as the camera 104 mounted on the mobile robot 100.

The control for changing the light emission pattern, such as between the first light emission pattern and the second light emission pattern, can include control for changing at least one of the brightness, hue, saturation, and lightness of light that is emitted from the light-emitting unit exemplified by the first light-emitting unit 11 and the second light-emitting unit 12. In an example in which the light-emitting units are mounted at a plurality of positions away from each other as exemplified by the first light-emitting unit 11 and the second light-emitting unit 12, the control for changing the light emission pattern can include control for controlling the first light-emitting unit 11 and the second light-emitting unit 12 to emit light with different light emission parameters from each other. As used herein, the light emission parameter can be at least one of the following: brightness, hue, saturation, and lightness.

In the example in which the light-emitting units are mounted at a plurality of positions away from each other as exemplified by the first light-emitting unit 11 and the second light-emitting unit 12, the control for changing the light emission pattern can include changing the light emission position. In a certain light emission pattern, light emission can be controlled so that light is emitted at all the positions. In another light emission pattern, light emission can be controlled so that light is turned off at all the positions. For example, the control for changing the light emission pattern can include control for turning off one of the first light-emitting unit 11 and the second light-emitting unit 12 and controlling only the other light-emitting unit to emit light, that is, control for turning on and off the light emission.

In the example in which the light-emitting units are mounted at a plurality of positions away from each other as exemplified by the first light-emitting unit 11 and the second light-emitting unit 12, the control for changing the light emission pattern can include changing a plurality of positions where light is synchronously emitted. With such a configuration, the mobile robot 100 can more clearly notify the surroundings of the mobile robot 100 of its traveling state.

Examples of such light emission patterns will be described. In a certain light emission pattern, only the first light-emitting unit 11 is controlled to emit light. In another light emission pattern, only the second light-emitting unit 12 is controlled to emit light. In still another light emission pattern, the first light-emitting unit 11 and the second light-emitting unit 12 are synchronized to emit light. Examples of synchronizing the first light-emitting unit 11 and the second light-emitting unit 12 to emit light include the examples of "first predetermined condition" and "second predetermined condition (user operation mode)" in FIG. 5. In an example in which the mobile robot 100 includes light-emitting units at three or more positions, a light emission pattern can be selected from many light emission patterns obtained from various combinations of the three or more light-emission units.

Examples of controlling the first light-emitting unit 11 and the second light-emitting unit 12 to emit light without synchronizing them include the example of "second predetermined condition (autonomous movement mode)" in FIG. 5. In the example of "second predetermined condition (autonomous movement mode)" in FIG. 5, the first light-emitting unit 11 and the second light-emitting unit 12 are shown hatched in opposite directions, but such hatching is merely for convenience and indicates that these light-emitting units are different from each other only in phase. In the case where the first light-emitting unit 11 and the second light-emitting unit 12 are controlled to emit light alternately, this example can be regarded as an example in which the timing to turn on the first light-emitting unit 11 and the timing to turn off the second light-emitting unit 12 are synchronized. As described above, the control computer 101 can control, as a certain light emission pattern, light emission of the first light-emitting unit 11 and the second light-emitting unit 12 so that they emit light at alternate timings, namely so that they emit light alternately.

The control computer 101 need not necessarily control light emission so that the first light-emitting unit 11 and the second light-emitting unit 12 emit light at alternate timings. The control computer 101 may control, as a certain light emission pattern, the first light-emitting unit 11 and the second light-emitting unit 12 to emit light out of phase from each other. Light emission can thus be presented in various rhythms to the surroundings.

At a plurality of positions where light is synchronously emitted, light may be emitted in a light emission pattern having a mutually complementary relationship. The "light emission pattern having a mutually complementary relationship" can be a pattern in which the first light-emitting unit 11 and the second light-emitting unit 12 are controlled to emit light in colors that are easily visible when seen as a combination, such as a pattern in which the first light-emitting unit 11 and the second light-emitting unit 12 are controlled to emit light in complementary colors.

The second light emitting unit 12 may include a plurality of individual light-emitting units mounted so as to surround the stick unit 131 at different distances from the horizontal center position of the stick unit 131 from each other. That is, the second light-emitting unit 12 can include, for example, two or three individual light-emitting units mounted so as to surround the stick unit 131. Various light emission patterns can thus be presented even by the second light-emitting unit 12 alone. Particularly in a situation where an operation is to be prompted, the light-emitting portions of the individual light-emitting units are turned on sequentially from the inner individual light-emitting unit toward the outer individual light-emitting unit. The first light emitting unit 11 may also include a plurality of individual light-emitting units.

By using such various light emission patterns as described above, the mobile robot 100 can even more clearly notify the surroundings of the mobile robot of which of the predetermined conditions is satisfied, whether the mobile robot 100 is in the autonomous movement mode or the user operation mode, etc. For example, when there is no traveling abnormality in the traveling state, the control computer 101 may reduce light emission to save power. When there is a traveling abnormality in the traveling state, the control computer 101 may make light emission stand out to allow to better notify the surroundings of the occurrence of the traveling abnormality.

The system control described above may include control for stopping the movement of the mobile robot 100 when it is determined that there is a traveling abnormality in the traveling state. Since the movement of the mobile robot 100 can be stopped when there is a traveling abnormality in the traveling state, it is possible to prevent the worse from happening.

Figure 6:
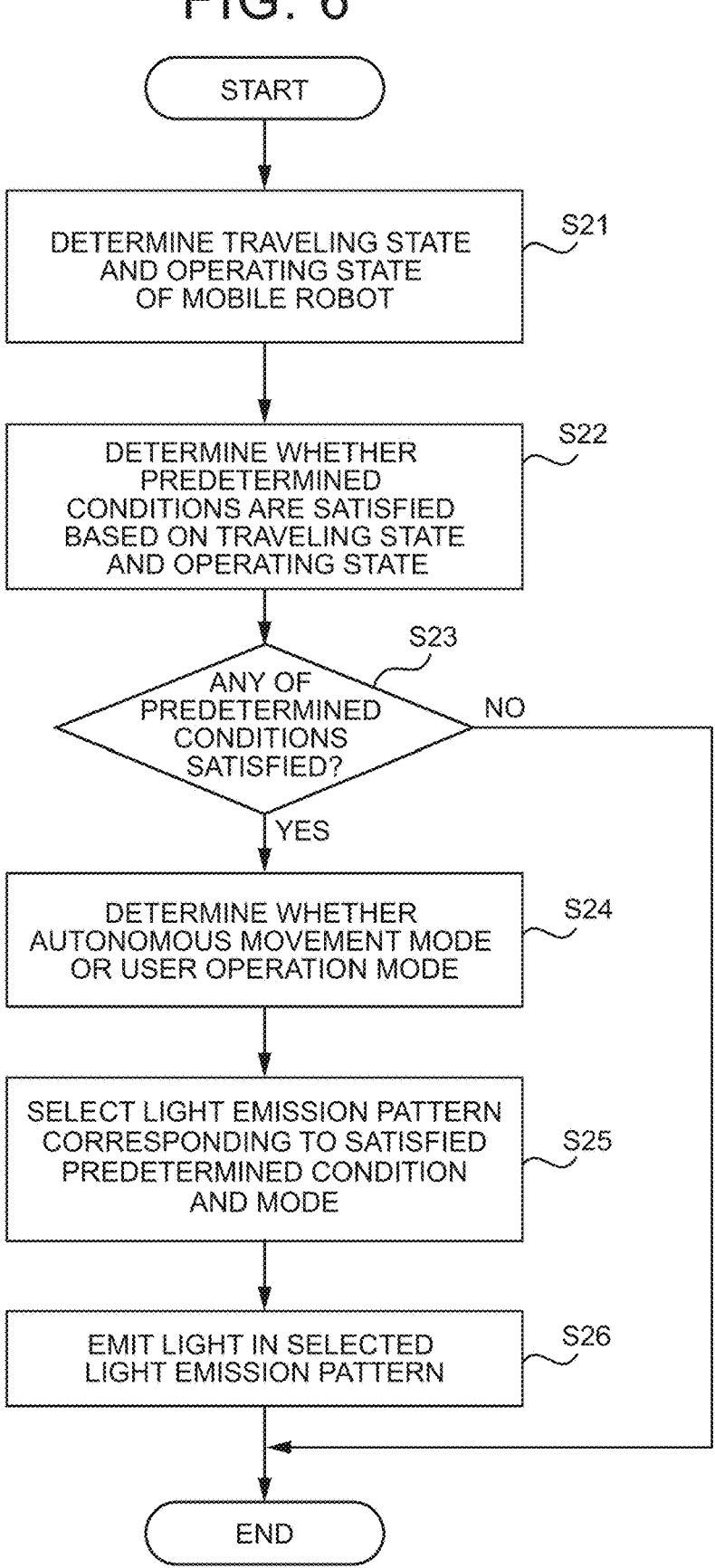
FIG. 6 is a flowchart illustrating another example of the light emission process that is performed by the mobile robot in FIG. 1.

Next, another example of the light emission process that can be used in the present embodiment will be described with reference to FIGS. 6 and 7. FIG. 6 is a flowchart illustrating another example of the light emission process that is performed by the mobile robot 100. FIG. 7 shows another example of the light emission patterns that can be implemented by the mobile robot 100.

At least one of the predetermined conditions that are used can be a predetermined condition for recommending a movement operation to be performed by the user. In the following description, such a predetermined condition will be referred to as a recommendation condition. The recommendation condition refers to a condition that there is a need to prompt the user to perform a movement operation. For example, the recommendation condition can refer to a condition that the mobile robot 100 has no operational abnormality but is unable to move due to occurrence of a traveling abnormality such as hitting a wall. In this example, either or both of the operation unit 130 and the joystick device can receive a movement operation. However, an operation unit that is not included in the mobile robot 100 may receive a movement operation.

By setting the conditions in this manner, the mobile robot 100 can make a notification recommending a movement operation to be performed by the user visible to people around the mobile robot 100. The predetermined conditions that are used may include a plurality of recommendation conditions for recommending different operations from each other. This allows the mobile robot 100 to indicate what is recommended to the surroundings by different light emission patterns.

The recommendation conditions may include a condition for recommending an operation to switch from the autonomous movement mode to the user operation mode, that is, a condition for recommending an operation to enable the operation unit to receive movement operations for the mobile robot 100. This condition can be a condition that it is a situation where it is determined that the mobile robot 100 will fall into a state that needs action if the mobile robot 100 travels in the autonomous movement mode because the traveling state indicates that there are many people around the mobile robot 100. The mobile robot 100 can thus make a notification recommending switching to the user operation mode visible to the people around the mobile robot 100, and if among those people there is any staff member who can operate the mobile robot 100, the staff member can be prompted to switch the mobile robot 100 to the user operation mode.

The recommendation conditions may include a condition for recommending an operation to move the mobile robot 100 in a predetermined direction. This condition can be, for example, a condition that there is a need to detour as there are many people around the mobile robot 100. It is preferable to indicate a detour route as the predetermined direction, which is particularly advantageous when in the user operation mode.

In particular, when the recommendation condition for recommending an operation to move the mobile robot 100 in the predetermined direction is satisfied, the control computer 101 preferably controls the first light-emitting unit 11 and the second light-emitting unit 12 to emit light so as to indicate the predetermined direction. For example, the light emission position may be changed according to the predetermined direction. In this case, the light-emitting unit near the operation unit, such as the second light-emitting unit 12 around the joystick device, may be controlled to indicate the predetermined direction, so that the user can easily recognize the predetermined direction. In this example, light is emitted to indicate the actual recommended movement direction, that is, the recommended orientation. Therefore, the light emission position is changed according to the current direction of the mobile robot 100, that is, according to the current orientation.

An example of such control will be described. The control computer 101 determines the traveling state and operating state of the mobile robot 100 (step S21) as in step S11 in FIG. 4. The control computer 101 then determines, based on the determined traveling state and operating state, whether any of the predetermined conditions that are used is satisfied (step S22). When the determination result is NO, that is, when NO in step S23, the process ends.

When YES in step S23, the control computer 101 determines whether the current mode is the autonomous movement mode or the user operation mode (step S24). In step S24, of information indicating the operating state, information indicating whether the current mode is the autonomous movement mode or the user operation mode can be obtained by referring to the current movement mode in the control computer 101.

Subsequently, the control computer 101 selects a light emission pattern corresponding to the satisfied predetermined condition and the current mode (step S25). The control computer 101 then controls the first light-emitting unit 11 and the second light-emitting unit 12 to emit light in the selected light emission pattern (step S26), and the process ends. Such a process can be repeated, for example, every time there is a change in detection results from the sensors that are used to determine the traveling state or the operating state, or at predetermined intervals.

In steps S25, S26, the control computer 101 can perform the selection of a light emission pattern and the light emission control based on, for example, the correspondence between the states and the light emission patterns exemplified in FIG. 7.

In FIG. 7, the light emission patterns defined by the colors and turn-on patterns of light emission from the first light-emitting unit 11 and the second light-emitting unit 12 are exemplified for each of the following cases: "autonomous movement mode and normal," "user operation mode and normal," and either the traveling state and the operating state indicates "abnormality." As used herein, "normal" indicates that both the traveling state and the operating state are normal. As can be seen from the example of the light emission patterns shown in FIG. 7, the second light-emitting unit 12 near the operation unit 130 and the stick unit 131 mainly indicates the mode when the mobile robot 100 is normal and an abnormality in the mobile robot 100, and the first light-emitting unit 11 indicates also the detailed operating state of the mobile robot 100 in the autonomous movement mode.

In FIG. 7, the case of "autonomous movement mode and normal" is divided into the following four cases in order to indicate the detailed operating state in the autonomous movement mode. That is, FIG. 7 show an example of the light emission patterns for the following four cases: "traveling autonomously" indicating that the mobile robot 100 is moving autonomously, "on standby" indicating that the mobile robot 100 is under autonomous movement control but is stopped on standby, "prompt an operation" indicating a situation where the user is prompted to perform some kind of operation, and "alert" indicating a situation where some kind of alert is given to the user or the surroundings. In this example, the case of "on standby" can refer to, for example, the case where the mobile robot 100 is being charged with a charger or is waiting for an elevator. The case of "prompt an operation" can refer to, for example, the case where the mobile robot 100 has arrived at a transport destination. The case of "alert" can refer to, for example, the case where the lifting mechanism 140 is being raised or lowered or the case where the mobile robot 100 is approaching an intersection. The case of "traveling autonomously" refers to the other cases where the mobile robot 100 is traveling autonomously.

FIG. 7 also shows an example of the turn-on patterns including a "breathing rhythm" in which the brightness of light emission is changed in a rhythm similar to the rhythm of human breathing, and "sequential lighting" in which the light-emitting portions are turned on in a sequence. Examples of the sequential lighting include controlling the first light-emitting unit 11 to sequentially turn on its light-emitting portions around the lifting mechanism 140 and controlling the second light-emitting unit 12 to sequentially turn on its light-emitting portions around the stick unit 131.

The examples of the colors and turn-on patterns shown in FIG. 7 are applicable to such process examples as described with reference to FIGS. 4 and 5.

As exemplified for the case of "prompt an operation" in FIG. 7, the light emission pattern associated with the rec-ommendation condition is provided by at least the second light-emitting unit 12. With such a configuration, a notification recommending a movement operation to be performed by the user can be presented at a position easily visible from the operation position and its surroundings, and can thus be made visible to the people around the mobile robot 100 such as the operator.

Although only one light emission pattern is shown for an abnormality in the example in FIG. 7, the light emission pattern may be changed between an abnormality in the autonomous movement mode and an abnormality in the user operation mode.

Although not exemplified in FIG. 7, the first light-emit-ting unit 11 may be controlled to emit light in a light emission pattern associated with a predetermined condition other than the recommendation condition out of the prede-termined conditions that are used. With such a configuration, a notification other than a notification recommending a movement operation to be performed by the user can be made visible to the people around the mobile robot at a position different from the operation position and its sur-roundings, so that the people can easily determine that the notification is not a recommendation for the operation. The above and other examples of the notification not recom-mending a movement operation to be performed by the user will be described later.

The configuration in which the mobile robot 100 includes a joystick device for operating the mobile robot 100 is described above. In this configuration, a control unit (exem-plified by the control computer 101) provided in the mobile robot 100 other than in the joystick device preferably basically send a control signal for the light emission control to the first light-emitting unit 11 and the second light-emitting unit 12. However, a control unit (not shown) provided in the joystick device may output a control signal for the light emission control to the first light-emitting unit 11 and the second light-emitting unit 12. In that case, the control computer 101 may make a determination as to the predetermined conditions etc. for the light emission control and send the result of the determination to the control unit provided in the joystick device, or the control unit provided in the joystick device may make a determination as to the predetermined conditions etc. for the light emission control.

The above description illustrates an example in which the transport system is mainly composed of the mobile robot 100. However, the control system according to the present embodiment may be any system such as the transport system described above as long as it performs system control for controlling a system including a mobile robot. This system may also include a server that is connectable to the mobile robot 100 via wireless communication. This server is a server that provides information for autonomous movement to the mobile robot 100. This server can also be referred to as a host management device, and is not limited to a server configured as a single device, but may be constructed as a system in which functions are distributed between or among a plurality of devices.

Figure 8:
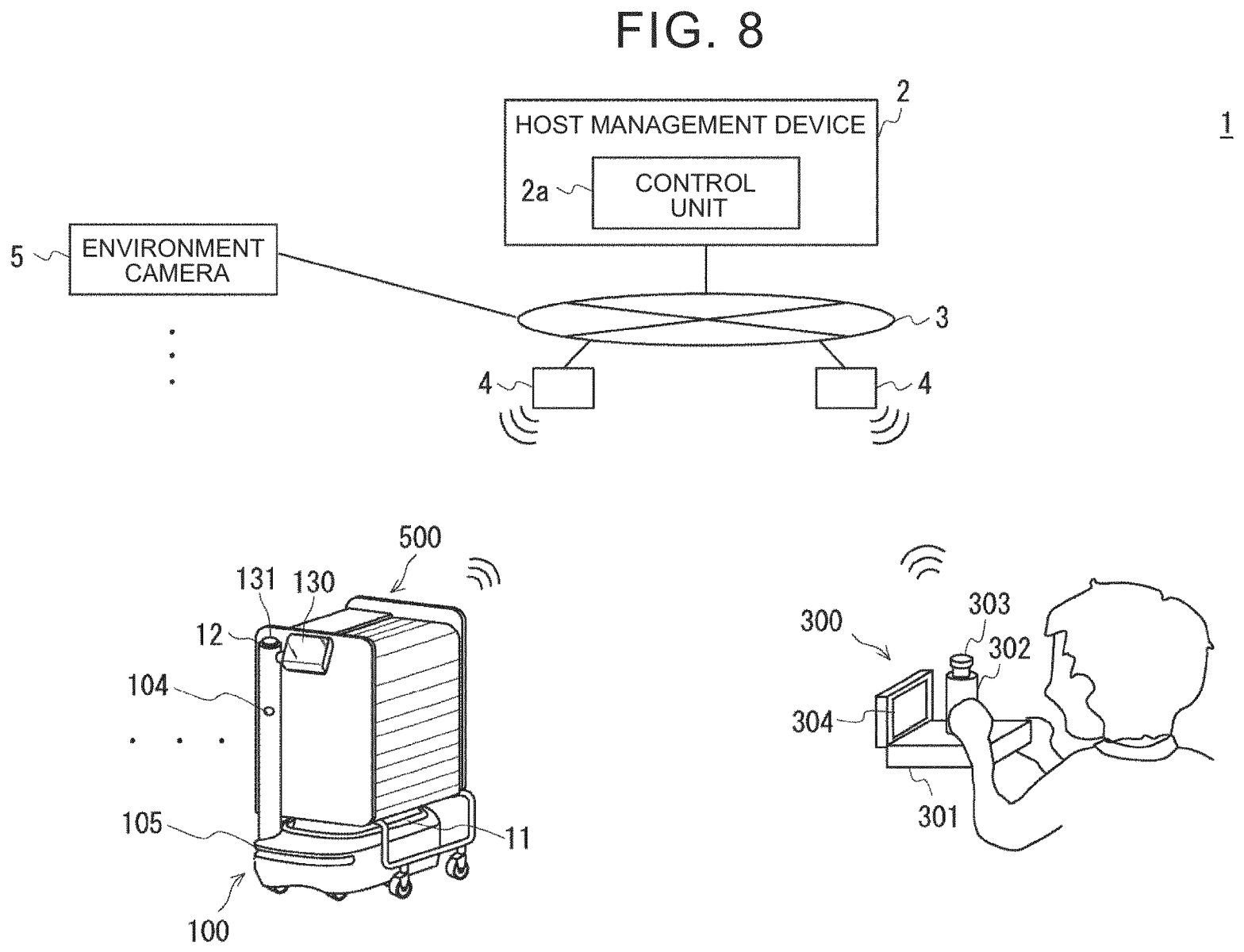

An example in which this transport system includes the mobile robot 100 and the host management device will be described below with reference to FIG. 8. FIG. 8 is a schematic diagram showing an example of the overall configuration of the transport system including the mobile robot 100.

As shown in FIG. 8, a transport system 1 includes the mobile robot 100, a host management device 2, a network 3, a communication unit 4, an environment camera 5, and user equipment 300. The transport system 1 is a system for transporting a transport object by the mobile robot 100, and includes a control system according to this configuration example. In this example, the "control system" can refer to the mobile robot 100 and the host management device 2, or to the components of control systems provided in the mobile robot 100 and the host management device 2. Alternatively, the "control system" can refer to, for example, the mobile robot 100, the host management device 2, and the user equipment 300, or to the components of control systems provided in the mobile robot 100, the host management device 2, and the user equipment 300.

The mobile robot 100 and the user equipment 300 are connected to the host management device 2 via the communication unit 4 and the network 3. The network 3 is a wired or wireless local area network (LAN) or wide area network (WAN). The host management device 2 and the environment camera 5 are connected to the network 3 by wire or wireless. As can be seen from this configuration, each of the mobile robot 100, the host management device 2, and the environment camera 5 includes a communication unit. The communication unit 4 is, for example, a wireless LAN unit installed in each environment. The communication unit 4 may be a general-purpose communication device such as a WiFi (registered trademark) router.

The host management device 2 is a device that is connectable to the mobile robot 100 by wireless communication, and is a management system that manages a plurality of mobile robots 100. The host management device 2 can include a control unit 2a for controlling the mobile robots 100. The control unit 2a can be implemented by, for example, integrated circuitry, and can be implemented by, for example, a processor such as an MPU or a CPU, a working memory, and a nonvolatile storage device. Control programs to be executed by the processor are stored in the storage device, and the processor can perform the function of the control unit 2a by reading the control programs into the working memory and executing them. The control unit 2a can be referred to as a control computer.

The transport system 1 can efficiently control the mobile robots 100 while autonomously moving the mobile robots 100 in the autonomous movement mode inside a predetermined facility or while moving the mobile robots 100 in the user operation mode according to user operations inside the predetermined facility. The "facility" can refer to various types of facilities including medical and welfare facilities such as hospitals, rehabilitation facilities, nursing homes, and residential care homes for the elderly, commercial facilities such as hotels, restaurants, office buildings, event venues, and shopping malls, and other complex facilities.

In order to perform such efficient control, a plurality of environment cameras 5 can be installed inside the facility. Each environment camera 5 acquires an image of the range in which a person or the mobile robot 100 moves, and outputs image data representing the image. This image data may be still image data or moving image data. In the case where the image data is still image data, the still image data is obtained at each imaging interval. In the transport system 1, the host management device 2 collects the images acquired by the environment cameras 5 and information based on these images. As for the images that are used to control the mobile robots 100, the images etc. acquired by the environment cameras 5 may be directly sent to the mobile robots 100, and in the user operation mode, may be sent to the user equipment 300 either directly or via the host management device 2. The environment cameras 5 can be installed as surveillance cameras in passages inside the facility or at entrances to the facility.

The host management device 2 can determine, for each transport request, the mobile robot 100 to perform the transport task, and can send to the determined mobile robot 100 an operation command to perform the transport task. The mobile robot 100 can autonomously move from a transport origin to a transport destination according to the operation command. In this case, a transport route etc. may be determined by any method.

For example, the host management device 2 assigns the transport task to the mobile robot 100 located at or near the transport origin. Alternatively, the host management device 2 assigns the transport task to the mobile robot 100 heading toward or near the transport origin. The mobile robot 100 to which the transport task has been assigned moves to the transport origin to pick up a transport object.

The user equipment 300 is a device that remotely operates the mobile robot 100 either directly or via the host management device 2 when in the user operation mode. The user equipment 300 can have a communication function for this remote operation, and can include a display unit 304. In the case where the user equipment 300 is a device that remotely operates the mobile robot 100 via the host management device 2, it can also be said that the user equipment 300 is a remote operation device for the host management device 2. Various types of terminals such as a tablet computer and a smartphone can be used as the user equipment 300. The user equipment 300 can also receive a switch operation to switch between the user operation mode and the autonomous movement mode. When this switch operation is performed, the mode of the mobile robot 100 can be switched via the host management device 2.

An example will be given below in which the user equipment 300 includes a joystick device. The user equipment 300 can include a stick unit 302 and a button 303 as part of the joystick device, in addition to a body 301. The joystick device is a device that is operated to move the mobile robot 100 in a direction intended by the user when in the user operation mode. The joystick device can receive a directional operation when the stick unit 302 is tilted in a direction in which the user wants the mobile robot 100 to move. The button 303 can be provided on, for example, the upper surface of the stick unit 302. The joystick device can also be controlled to perform a switch operation to switch between the autonomous movement mode and the user operation mode by depressing the button 303. Alternatively, the joystick device may be controlled to perform a select operation by depressing the button 303. The button 303 may be configured to serve as an emergency stop button when it is depressed for a predetermined period. In the case where the button 303 is configured to receive two or more of the switch operation, the select operation, and the emergency stop operation, that is, in the case where a plurality of operations is assigned to the button 303, predetermined periods corresponding to the operations need only be set for the button 303.

In the case where the user equipment 300 includes a joystick device, the user can perform similar operations even when the mobile robot 100 does not include a joystick device. The mobile robot 100 may include a button similar to the button 303 on the upper surface of the stick unit 131 etc. It is herein assumed that, in the configuration in which the transport system 1 manages a plurality of mobile robots 100, the mobile robot 100 to be remotely operated can be selected via the user equipment 300 when in the user operation mode.

The display unit 304 can display an image indicated by image data received from the camera 104 of the mobile robot 100 and an image indicated by image data received from the environment camera 5 located around the mobile robot 100. This allows the user to operate the mobile robot 100 using the stick unit 302 and the button 303.

The user equipment 300 can function as a device for sending a transport request etc. to the host management device 2. This transport request can include information indicating a transport object.

In the transport system 1 configured as described above, the host management device 2 preferably outputs a control signal for the light emission control regardless of whether a joystick device is provided in the mobile robot 100, the user equipment 300, or both. In the case where the host management device 2 outputs this control signal, the control unit 2a can output the control signal. In that case, the control unit 2a of the host management device 2 preferably makes a determination as to the predetermined conditions etc. for the light emission control. However, the control computer 101 may make this determination and send the result of the determination to the host management device 2, or the control unit provided in the joystick device may make this determination and send the result of the determination to the host management device 2.

Alternatively, the transport system 1 may be configured so that the control unit (not shown) provided in the joystick device outputs a control signal for the light emission control. In the case where a joystick device is provided in either the mobile robot 100 or the user equipment 300, the control unit of the joystick device can output the control signal. In the case where a joystick device is provided in both the mobile robot 100 and the user equipment 300, the control unit of either joystick device may output the control signal, or the control unit of the joystick device provided in the mobile robot 100 may output the control signal to the light-emitting unit mounted on or around the joystick device.

Alternatively, in the transport system 1 configured as described above, the control unit (exemplified by the control computer 101) provided in the mobile robot 100 may be configured to output a control signal for the light emission control. In that case, the control computer 101 preferably makes a determination as to the predetermined conditions etc. for the light emission control. However, the control unit 2a of the host management device 2 or the control unit provided in the joystick device may make this determination and send the result of the determination to the mobile robot 100. Instead of the transport system 1, a transport system may be configured not to include the host management device 2. In the case of this configuration, the control unit of the mobile robot 100 exemplified by the control computer 101 can make a determination as to the predetermined conditions etc. and output a control signal for the light emission control. However, for example, the control unit provided in the joystick device of the mobile robot 100 may make a determination as to the predetermined conditions etc. and output a control signal for the light emission control.

The control system in the transport system 1 can perform the following control at least when the host management device 2 is unable to communicate with the mobile robot 100. In the case where the host management device 2 is unable to communicate with the mobile robot 100, the control system can determine, based on an image of the mobile robot 100 captured by the environment camera 5, whether the mobile robot 100 is in the autonomous movement mode or the user operation mode from the light emission pattern shown by the image. This image can be an image captured by a camera of another mobile robot included in the transport system 1, instead of or in addition to the image captured by the environment camera 5.

The mobile robot 100 can present various light emission patterns according to whether the predetermined conditions are satisfied etc. as exemplified in FIGS. 5 and 7, and the host management device 2 can determine the current mode, state, etc. of the mobile robot 100 from the light emission pattern currently presented by the mobile robot 100. Although only one light emission pattern is shown for an abnormality in the example in FIG. 7, the light emission pattern may be changed between an abnormality in the autonomous movement mode and an abnormality in the user operation mode. This allows the host management device 2 to determine whether the mobile robot 100 is in the autonomous movement mode or the user operation mode even when the mobile robot 100 has an abnormality.

In the control system of the transport system 1 having such a configuration, the host management device 2 can determine whether the mobile robot 100 satisfies any of the predetermined conditions and whether the mobile robot 100 is in the autonomous movement mode or the user operation mode, even when the mobile robot 100 and the host management device 2 are unable to communicate with each other.

Accordingly, for example, when the mobile robot 100 that is unable to communicate satisfies a certain predetermined condition and is in the autonomous movement mode, the host management device 2 can instruct the user to manually move the mobile robot 100 or to collect and inspect the mobile robot 100, etc. The user can then perform the work according to the instruction. For example, when the mobile robot 100 that is unable to communicate satisfies a certain predetermined condition that puts the mobile robot 100 on standby and is in the user operation mode, it means that the operator is away from the mobile robot 100, leaving the mobile robot 100 unattended. In such a case, the host management device 2 can notify the operator to return to the mobile robot 100.

How the mobile robot 100 determines a traveling abnormality will be described below. In the transport system 1 as well, the mobile robot 100 can determine a traveling abnormality by the method described with reference to FIG. 1 etc.

As another determination method, the mobile robot 100 can determine a traveling abnormality from an image captured by the environment camera 5 and sent to the mobile robot 100 either directly or via the host management device 2. An image captured by a camera of another mobile robot rather than the environment camera 5 may be used for the determination. In other words, the control computer 101 can determine a traveling abnormality based on an image captured by a camera installed in a facility where the mobile robot 100 is used, as exemplified by the environment camera 5 or the camera of another mobile robot. The control unit 2a of the host management device 2 may make such a determination. In that case, information indicating the traveling state is preferably sent in advance to the mobile robot 100 in case of interruption of wireless communication with the host management device 2.

Even in the configuration in which the mobile robot 100 acquires the information indicating the traveling state from the host management device 2, the mobile robot 100 can acquire this information before communication with the host management device 2 is interrupted. Therefore, the mobile robot 100 can perform the light emission control according to the information obtained before communication is interrupted.

Figure 9:
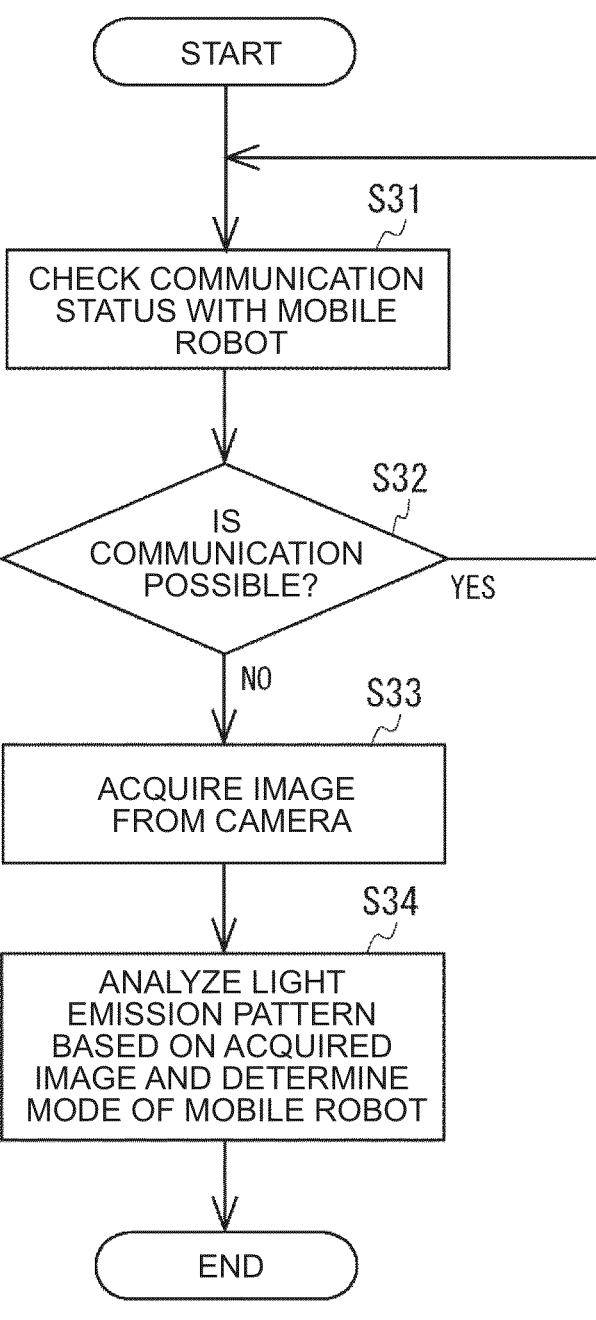
FIG. 9 is a flowchart illustrating an example of a process that is performed by a host management device in the system in FIG. 8.

An example of a process that is performed by the host management device 2 of the transport system 1 will be described with reference to FIG. 9. FIG. 9 is a flowchart illustrating an example of the process that is performed by the host management device 2 of the transport system 1 in FIG. 8.

First, the control unit 2a of the host management device 2 monitors the communication unit, not shown, to check the communication status with the mobile robot 100 (step S31), and determines whether communication with the mobile robot 100 is possible (step S32). When the control unit 2a determines that communication with the mobile robot 100 is possible, the process returns to step S31, and the control unit 2a continues to monitor the communication unit. When the control unit 2a determines that communication with the mobile robot 100 is not possible, the control unit 2a acquires an image from a camera (step S33). This camera can be the environment camera 5, the camera installed in another mobile robot traveling near the position where communication with the mobile robot 100 is interrupted, or both.

The control unit 2a then analyzes the light emission pattern of the mobile robot 100 based on the acquired image and determines whether the mobile robot 100 is in the autonomous movement mode or the user operation mode (step S34), and the process ends. Step S34 can include determining which of the predetermined conditions is satisfied. The control unit 2a may be configured so that, when analyzing the light emission pattern and determining the mode of the mobile robot 100, the control unit 2a obtains the mode of the mobile robot 100, namely whether the mobile robot 100 is in the autonomous mode or the user operation mode, from an image using a learning model obtained through machine learning.

As described above, in the control system of the transport system 1, the host management device 2 can determine whether the mode indicated by the light emission pattern of the mobile robot 100 is the autonomous movement mode or the user operation mode and whether the mobile robot 100 satisfies any of the predetermined conditions, even when the mobile robot 100 and the host management device 2 are unable to communicate with each other.

In the configuration in which the mobile robot 100 can indicate its operating state by the light emission pattern, that is, in the configuration in which the predetermined conditions include the condition regarding the operating state, this control system can determine the operating state of the mobile robot 100 from the light emission pattern shown by the image. Accordingly, for example, when the mobile robot 100 that is unable to communicate has an operational abnormality, an instruction to collect and inspect the mobile robot 100, etc. can be given to the user, and the user can perform the work according to the instruction.

Even in a configuration in which the transport system does not include the host management device 2, the transport system can include the environment camera 5 that is wirelessly communicable with the mobile robot 100. Even in such a configuration example, the mode of the mobile robot 100 etc. can be similarly determined from the image obtained from the environment camera 5. When the mobile robot 100 is communicable with any other mobile robot, the mode of the mobile robot 100 etc. can be determined based on the image acquired by the camera mounted on that mobile robot.

The above description is given based on an example in which the mobile robot 100 and the user equipment 300 are equipped with a joystick device as an operation interface for performing movement operations for the mobile robot 100. However, various other types of operation interfaces may be used as the operation interface. For example, an operation device that receives movement operations from a user interface displayed using software as exemplified for the operation unit 130 may be used as the operation interface. The light-emitting unit may be implemented by displaying a light emission pattern on the user interface. The operation interface may be, for example, a touch sensor or an operation device with a touch sensor. The operation interface can receive a movement operation for the mobile robot 100 as the user slides a finger on the touch sensor.

The above embodiment is described on the assumption that at least one of the predetermined conditions is a predetermined condition (recommendation condition) for recommending a movement operation to be performed on the mobile robot 100 by the user. However, at least one of the predetermined conditions may be a non-recommendation condition that is a predetermined condition for not recommending a movement operation to be performed on the mobile robot 100 by the user. An example using such a non-recommendation condition will be briefly described below. The description regarding the various examples using the recommendation condition can also be used for this example.

The non-recommendation condition is an opposite condition to the recommendation condition, and can be, for example, an action condition for eliminating the need for a movement operation that has already been performed by the user. This action condition includes, for example, a condition that the recommendation condition under which a movement operation has been recommended to be performed by the user is no longer satisfied, that is, a condition for canceling the recommendation condition or a condition for eliminating the recommendation condition. The non-recommendation condition may include a condition for not recommending a user operation to enable the mobile robot 100 to receive a movement operation, namely a condition for not recommending an operation to switch the mobile robot 100 from the autonomous movement mode to the user operation mode. The non-recommendation condition may include, for example, a condition for not recommending a movement operation to move the mobile robot 100 in a predetermined direction. For example, the non-recommendation condition may be a condition that a traveling abnormality such as hitting a wall will occur if a movement operation to keep the mobile robot 100 moving in the predetermined direction is performed.

When the non-recommendation condition is satisfied, the control computer 101 can control, for example, the first light-emitting unit 11 and the second light-emitting unit 12 to emit light. With such a configuration, it is possible to make the user aware that he or she does not need to perform a movement operation in a situation where it is not desirable for the user to perform a movement operation on the mobile robot 100 that is autonomously movable and operable by the user. In a more specific example, when the non-recommendation condition for not recommending a movement operation to move the mobile robot 100 in the predetermined direction is satisfied, the control computer 101 preferably controls the first light-emitting unit 11 and the second light-emitting unit 12 to emit light so as to indicate the predetermined direction.

An example in which the predetermined conditions that are used include a plurality of recommendation conditions for recommending different operations from each other, that is, an example in which the predetermined conditions include a set of a plurality of recommended operations for recommending different operations from each other, is described above. However, such non-recommendation conditions as described above can also be used. That is, the predetermined conditions that are used can include a set of a plurality of non-recommendation conditions for not recommending different operations from each other. The user can thus visually recognize an operation that is not desired to be performed out of a plurality of operations. Alternatively, the predetermined conditions that are used may include a set of recommendation conditions and non-recommendation conditions for recommending and not recommending the same operations. The user can thus visually recognize a situation where a certain operation is desired to be performed and a situation where the certain operation is not desired to be performed.

In the case where at least one of the predetermined conditions that are used is a non-recommendation condition, the light emission control may include either control for controlling the light-emitting unit to emit light so as to indicate a predetermined direction or control for controlling the light-emitting unit to emit light so as to indicate an opposite direction to the predetermined direction when the non-recommendation condition for not recommending a movement operation to move the mobile robot 100 in the predetermined direction is satisfied. When controlling the light-emitting unit to emit light so as to indicate the predetermined direction, it is preferable to control the light-emitting unit to emit light in a color different from the color of light that is emitted when the recommendation condition is satisfied, and thus clearly present the difference to the user. With such a configuration, the control system can clearly notify the user that a movement operation in the predetermined direction is not required.

When at least one of the predetermined conditions that are used is a non-recommendation condition, the light emission pattern associated with the non-recommendation condition may be a light emission pattern that is provided by at least the first light-emitting unit 11. When performing such control, it is preferable to control the light-emitting unit to emit light in a color different from the color of light that is emitted when the recommendation condition is satisfied, and thus clearly present the difference to the user. With such a configuration, the control system can present a notification not recommending a movement operation to be performed by the user at a position easily visible from the operation position and its surroundings. The control system can therefore more reliably notify the user that the user operation is not necessary.

When at least one of the predetermined conditions that are used is a non-recommendation condition, the light emission pattern associated with the non-recommendation condition may be a light emission pattern that is provided by at least the second light-emitting unit 12. With such a configuration, the control system can make a notification not recommending a movement operation to be performed by the user visible to the user of the mobile robot at a position different from the operation position and its surroundings, so that the user can easily determine that the notification is not a recommendation for the movement operation.

Figure 10:
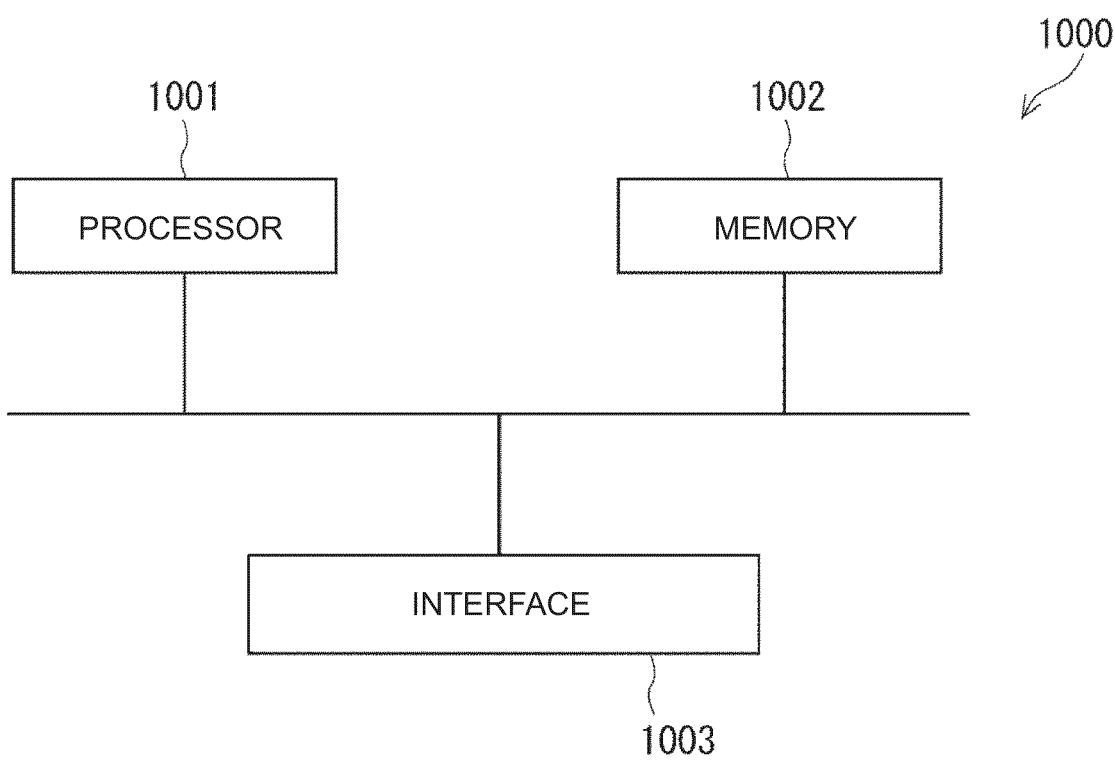
FIG. 10 shows an example of the hardware configuration of a device.

Each of the above various devices according to the embodiment, such as the control computer 101 of the mobile robot 100, the host management device 2, and the user equipment 300, can have, for example, the following hardware configuration. Alternatively, the operation device such as the joystick device provided in, for example, the mobile robot 100 or the user equipment 300 can have the following hardware configuration. FIG. 10 shows an example of the hardware configuration of each device.

A device 1000 shown in FIG. 10 can include a processor 1001, a memory 1002, and an interface 1003. The interface 1003 can include, for example, a communication interface and an interface with a drive unit, a sensor, an input and output device, etc. as necessary for the individual device.

The processor 1001 may be, for example, an MPU, a CPU, or a graphics processing unit (GPU). The processor 1001 may include a plurality of processors. The memory

1002 is, for example, a combination of a volatile memory and a nonvolatile memory. The functions of each device are implemented by the processor 1001 reading a program stored in the memory 1002 and executing it while sending and receiving necessary information via the interface 1003.

The program includes a group of instructions (or software codes) for causing a computer to perform one or more of the functions described in the embodiment when loaded into the computer. The program may be stored in a non-transitory computer-readable medium or a tangible storage medium. Examples of the computer-readable medium or the tangible storage medium include, but are not limited to, a random-access memory (RAM), a read-only memory (ROM), a flash memory, a solid-state drive (SSD), and other memory technologies, a compact disc read-only memory (CD-ROM), a digital versatile disc (DVD), a Blu-ray (registered trademark) disc, and other optical disc storages, and a magnetic cassette, a magnetic tape, a magnetic disk storage, and other magnetic storage devices. The program may be transmitted on a transitory computer-readable medium or a communication medium. Examples of the transitory computer-readable medium or the communication medium include, but are not limited to, propagating signals in electrical, optical, acoustic, or other forms.

The present disclosure is not limited to the embodiment described above, and may be modified as appropriate without departing from the spirit and scope of the disclosure.

What is claimed is:

1. A control system comprising:
a mobile robot that has an autonomous movement mode in which the mobile robot moves autonomously, and a user operation mode in which the mobile robot is operable by a user, the mobile robot comprising:
a platform including a lifting stage configured to load and unload a transport object, the lifting stage having a portion housed inside the platform and a loading surface exposed on an upper surface of the platform, the lifting stage configured to be raised and lowered autonomously or by user operation;
a joystick mounted on the platform and configured to receive a movement operation from the user, the joystick including a button configured to be depressed by the user to switch between the autonomous movement mode and the user operation mode;
a first LED positioned around and adjacent to the lifting stage;
a second LED positioned around and adjacent to the joystick; and
a controller configured to perform-system control for the mobile robot, the controller configured to perform:
mode switch control, based on operation of the button, for switching between the autonomous movement mode in which the mobile robot is moved autonomously and the user operation mode in which the mobile robot is moved based on a movement operation that is performed by the user, and
light emission control configured to control the first LED and the second LED to emit light in synchronization, in different light emission patterns, corresponding to a plurality of predetermined conditions;
wherein the light emission control is configured to:
(i) emit a first light-emission pattern when the mobile robot is in the autonomous movement mode,
(ii) emit a second light-emission pattern when the mobile robot is in the user operation mode, and
(iii) emit a third light-emission pattern indicating whether the lifting stage is being raised or lowered.

2. The control system according to claim 1, wherein at least one of the predetermined conditions is a recommendation condition that is predetermined condition for recommending the movement operation or a non-recommendation condition that is a predetermined condition for not recommending the movement operation.

3. The control system according to claim 2, wherein
the recommendation condition includes a condition for recommending an operation to switch from the autonomous movement mode to the user operation mode, and
the non-recommendation condition includes a condition for not recommending the operation to switch from the autonomous movement mode to the user operation mode.

4. The control system according to claim 2, wherein
at least one of the predetermined conditions is the recommendation condition, and
the first LED and the second LED is controlled to emit light in a light emission pattern associated with the recommendation condition.

5. The control system according to claim 1, wherein the different light emission patterns include light emission patterns that are different in at least one of brightness, hue, saturation, and lightness of light.

6. The control system according to claim 1, wherein
the system includes a server that is configured to be connected to the mobile robot via wireless communication, and
the control system is configured to determine, based on an image of the mobile robot captured by a camera, whether the mobile robot is in the autonomous movement mode or the user operation mode based on the light emission pattern shown in the image, at least when the server is unable to communicate with the mobile robot via the wireless communication.

7. The control system according to claim 1, wherein the different light emission patterns in which the first LED and the second LED are controlled include: (i) emitting light in complementary colors, (ii) emitting light in a pulsing rhythm, and (iii) a sequential lighting pattern in which portions of the first LED and portions of the second LED are turned on in sequence.

8. A control method for a mobile robot that has an autonomous movement mode in which the mobile robot moves autonomously, and a user operation mode in which the mobile robot is operable by a user, wherein the mobile robot comprising:
a platform including a lifting stage configured to load and unload a transport object, the lifting stage having a portion housed inside the platform and a loading surface exposed on an upper surface of the platform, the lifting stage configured to be raised and lowered autonomously or by user operation;
a joystick mounted on the platform and configured to receive a movement operation from the user, the joystick including a button configured to be depressed by the user to switch between the autonomous movement mode and the user operation mode;
a first LED positioned around and adjacent to the lifting stage;
a second LED positioned around and adjacent to the joystick; and
a controller configured to perform system control for the mobile robot;
the control method comprising using the controller to perform:

mode switch control, based on operation of the button, for switching between the autonomous movement mode in which the mobile robot is moved autonomously and the user operation mode in which the mobile robot is moved based on a movement operation that is performed by the user, and
light emission control configured to control the first LED and the second LED to emit light in synchronization, in different light emission patterns, corresponding to a plurality of predetermined conditions;
wherein the light emission control is configured to:
(i) emit a first light-emission pattern when the mobile robot is in the autonomous movement mode,
(ii) emit a second light-emission pattern when the mobile robot is in the user operation mode, and
(iii) emit a third light-emission pattern indicating whether the lifting stage is being raised or lowered.

9. The control method according to claim 8, wherein at least one of the predetermined conditions is a recommendation condition that is a predetermined condition for recommending the movement operation or a non-recommendation condition that is a predetermined condition for not recommending the movement operation.

10. The control method according to claim 9, wherein
the recommendation condition includes a condition for recommending an operation to switch from the autonomous movement mode to the user operation mode, and
the non-recommendation condition includes a condition for not recommending the operation to switch from the autonomous movement mode to the user operation mode.

11. The control method according to claim 9, wherein
at least one of the predetermined conditions is the recommendation condition, and
the first LED and the second LED is controlled to emit light in a light emission pattern associated with the recommendation condition.

12. The control system according to claim 8, wherein the different light emission patterns include light emission patterns that are different in at least one of brightness, hue, saturation, and lightness of light.

13. The control method according to claim 8, wherein
the system includes a server that is configured to be connected to the mobile robot via wireless communication, and
the control method further comprises determining, based on an image of the mobile robot captured by a camera, whether the mobile robot is in the autonomous movement mode or the user operation mode based on the light emission pattern shown in the image, at least when the server is unable to communicate with the mobile robot via the wireless communication.

14. The control method according to claim 8, wherein the different light emission patterns in which the first LED and the second LED are controlled include: (i) emitting light in complementary colors, (ii) emitting light in a pulsing rhythm, and (iii) a sequential lighting pattern in which portions of the first LED and portions of the second LED are turned on in sequence.

15. A non-transitory storage medium storing instructions that are executable by one or more processors and that cause the one or more processors to perform system control for a mobile robot that has an autonomous movement mode in which the mobile robot moves autonomously, and a user operation mode in which the mobile robot is operable by a user, wherein the mobile robot comprising:

a platform including a lifting stage configured to load and unload a transport object, the lifting stage having a portion housed inside the platform and a loading surface exposed on an upper surface of the platform, the lifting stage configured to be raised and lowered autonomously or by user operation;

a joystick mounted on the platform and configured to receive a movement operation from the user, the joystick including a button configured to be depressed by the user to switch between the autonomous movement mode and the user operation mode;

a first LED positioned around and adjacent to the lifting stage;

a second LED positioned around and adjacent to the joystick; and a controller configured to perform system control for the mobile robot;

the system control comprising using the controller to perform:

mode switch control, based on operation of the button, for switching between the autonomous movement mode in which the mobile robot is moved autonomously and the user operation mode in which the mobile robot is moved based on a movement operation that is performed by the user, and light emission control configured to control the first LED and the second LED to emit light in synchronization, in different light emission patterns, corresponding to a plurality of predetermined conditions;

wherein the light emission control is configured to:

(i) emit a first light-emission pattern when the mobile robot is in the autonomous movement mode, (ii) emit a second light-emission pattern when the mobile robot is in the user operation mode, and (iii) emit a third light-emission pattern indicating whether the lifting stage is being raised or lowered.

16. The non-transitory storage medium according to claim 15, wherein at least one of the predetermined conditions is a recommendation condition that is predetermined condition for recommending the movement operation or a non-recommendation condition that is a predetermined condition for not recommending the movement operation.

17. The non-transitory storage medium according to claim 16, wherein the recommendation condition includes a condition for recommending an operation to switch from the autonomous movement mode to the user operation mode, and the non-recommendation condition includes a condition for not recommending the operation to switch from the autonomous movement mode to the user operation mode.

18. The non-transitory storage medium according to claim 16, wherein at least one of the predetermined conditions is the recommendation condition, and the first LED and the second LED is controlled to emit light in a light emission pattern associated with the recommendation condition.

19. The non-transitory storage medium according to claim 16, wherein the different light emission patterns in which the first LED and the second LED are controlled include: (i) emitting light in complementary colors, (ii) emitting light in a pulsing rhythm, and (iii) a sequential lighting pattern in which portions of the first LED and portions of the second LED are turned on in sequence.

* * * * *